United States Patent
Kajiwara et al.

(10) Patent No.: US 10,496,355 B2
(45) Date of Patent: Dec. 3, 2019

(54) IMAGE MANAGEMENT SYSTEM, MANAGEMENT DEVICE, PROGRAM, AND IMAGE OUTPUT DEVICE

(71) Applicant: CHIKAKU, INC., Tokyo (JP)

(72) Inventors: Kenji Kajiwara, Tokyo (JP); Keisuke Oi, Tokyo (JP)

(73) Assignee: CHIKAKU, INC., Tokyo (JP)

( * ) Notice: Subject to any disclaimer, the term of this patent is extended or adjusted under 35 U.S.C. 154(b) by 57 days.

(21) Appl. No.: 15/318,651

(22) PCT Filed: Jun. 11, 2015

(86) PCT No.: PCT/JP2015/066920
§ 371 (c)(1),
(2) Date: Dec. 14, 2016

(87) PCT Pub. No.: WO2015/190567
PCT Pub. Date: Dec. 17, 2015

(65) Prior Publication Data
US 2017/0147276 A1     May 25, 2017

(30) Foreign Application Priority Data

Jun. 13, 2014 (JP) .................................. 2014-122034
Dec. 2, 2014 (JP) .................................. 2014-244469

(51) Int. Cl.
*G06F 3/14* (2006.01)
*G06F 13/00* (2006.01)
(Continued)

(52) U.S. Cl.
CPC ............ *G06F 3/1454* (2013.01); *G06F 13/00* (2013.01); *G06F 21/44* (2013.01); *G09G 5/003* (2013.01);
(Continued)

(58) Field of Classification Search
CPC ............. G06F 3/1454; H04N 1/00106; H04N 1/00344; H04N 1/32122; H04M 1/72522; G09G 5/003
See application file for complete search history.

(56) References Cited

U.S. PATENT DOCUMENTS

2004/0001226 A1   1/2004   Ohtuka
2008/0216002 A1*  9/2008   Morita .............. G06F 17/30056
                                                       715/764
(Continued)

FOREIGN PATENT DOCUMENTS

JP    2010-68015 A    3/2010
JP    2011-118858 A   6/2011
(Continued)

OTHER PUBLICATIONS

International Search Report in PCT/JP2015/066920, dated Sep. 29, 2015.
(Continued)

*Primary Examiner* — Towfiq Elahi
(74) *Attorney, Agent, or Firm* — Hauptman Ham, LLP

(57) ABSTRACT

There is provided an image management system having an image output device communicable with a management apparatus and a display device, wherein the management apparatus includes: a generation unit that generates an identifier of the image output device in response to a request from a communication terminal; a first transmission unit that transmits the identifier to the communication terminal; an authentication unit that authenticates the communication terminal using the identifier transmitted from the communication terminal; a first reception unit that receives image data from the authenticated communication terminal; and a second transmission unit that transmits the received image data to the image output device, and the image output device includes: a second reception unit that receives the transmit- (Continued)

ted image data; and an output unit that outputs, to the display device, the image data received by the second reception unit.

7 Claims, 27 Drawing Sheets

(51) Int. Cl.
| | |
|---|---|
| *G06F 21/44* | (2013.01) |
| *H04M 3/42* | (2006.01) |
| *H04M 3/487* | (2006.01) |
| *G09G 5/00* | (2006.01) |
| *H04M 1/725* | (2006.01) |
| *H04N 1/00* | (2006.01) |
| *H04N 1/32* | (2006.01) |
| *H04L 29/06* | (2006.01) |

(52) U.S. Cl.
CPC ......... *H04M 1/72522* (2013.01); *H04M 3/42* (2013.01); *H04M 3/487* (2013.01); *H04N 1/00106* (2013.01); *H04N 1/00344* (2013.01); *H04N 1/32122* (2013.01); *G09G 2370/022* (2013.01); *G09G 2370/06* (2013.01); *G09G 2380/16* (2013.01); *H04L 63/0876* (2013.01); *H04N 2201/0084* (2013.01); *H04N 2201/0087* (2013.01); *H04N 2201/0089* (2013.01); *H04N 2201/3205* (2013.01)

(56) References Cited

U.S. PATENT DOCUMENTS

| | | | |
|---|---|---|---|
| 2010/0099382 A1 | 4/2010 | Ishiguro et al. | |
| 2013/0332512 A1* | 12/2013 | Roman | ................. G06F 3/0481 709/203 |
| 2017/0094225 A1* | 3/2017 | Morita | .................... H04M 3/56 |

FOREIGN PATENT DOCUMENTS

| | | |
|---|---|---|
| JP | 2011-247914 A | 12/2011 |
| JP | 2013-149162 A | 8/2013 |

OTHER PUBLICATIONS

The Instructional, "iCloud Photo Sharing With Shared Photo Streams—The Instructional", Feb. 24, 2014 (Feb. 24, 2014), pp. 1-10, XP055436273, Retrieved from the Internet, http://www.theinstructional.com/guides/icloud-photo-sharing-with-shared-photo-streams, 10pp.

Apple. Inc, "iPhoto 9.5: iCloud Photo Sharing overview", Nov. 19, 2013 (Nov. 19, 2013), pp. 1-1, XP055435770, Apple support web site Retrieved from the Internet, https://support.apple.com/kb/PH15190?locale=en_GB, 1pp.

Apple. Inc, "iPhoto 9.5: Rate photos", Nov. 19, 2013 (Nov. 19, 2013), pp. 1-2, XP055436289, Retrieved from the Internet, https://support.apple.com/kb/PH15158?locale=en_GB, 2pp.

Andreas Huggel, "Exiv2—Image metadata library and tools", Dec. 2, 2013 (Dec. 2, 2013), pp. 1-29, XP055436387, Retrieved from the Internet, http://web.archive.org/web/20140614170922/http://www.exiv2.org/tags.html, 29pp.

\* cited by examiner

FIG. 7

| IDENTIFI-CATION NO. | VIEWER'S NAME | VIEWER'S POSTAL CODE | VIEWER'S ADDRESS | VIEWER'S TELEPHONE NUMBER | DEVICE ID | EXPIRATION DATE | POSTER'S NAME | POSTER'S E-MAIL ADDRESS | POSTER'S PASSWORD |
|---|---|---|---|---|---|---|---|---|---|
| 1 | ICHIRO YAMADA | 111-1111 | 1-1-1 CHIYODA, CHIYODA-KU, TOKYO | 03-1111-1111 | 010001 | 2014/4/30 | JIRO YAMADA | jiro@coolmail.com | ******* |
| 2 | TARO TANAKA | 222-2222 | 2-2-2 CHIYODA, CHIYODA-KU, TOKYO | 03-2222-2222 | 010002 | 2014/2/10 | JIRO TANAKA | jtana@ggmail.com | ******* |
| .. | .. | .. | .. | .. | .. | .. | .. | .. | .. |

| IDENTIFI-CATION NO. | FILE NAME | TITLE | SHOOTING DATE | ... | DELIVERY STATE | NUMBER OF RATINGS | NUMBER OF VIEWS |
|---|---|---|---|---|---|---|---|
| 1001 | newbaby.jpg | OUR BABY | 2014/3/1 | ... | NOT YET | 0 | 0 |
| 1002 | festival.jpg | ATHLETIC FESTIVAL | 2014/2/15 | ... | DONE | 1 | 5 |
| .. | .. | .. | .. | .. | .. | .. | .. |

160

370-1

| CONTROL CODE | OPERATION BUTTON |
|---|---|
| 2001 | A |
| 2002 | B |
| 2003 | C |
| 2004 | D |
| : | : |

| CONTROL CODE | OPERATION BUTTON |
|---|---|
| 2001 | A |
| 2003 | B |
| 2004 | C |
| 2002 | D |
| : | : |

Enter Viewer (Shipping Destination) Information.

Name
Ichiro Yamada

Postal Code
111-1111

Address
1-1-1 chiyoda, Chiyoda-ku, Tokyo

Telephone Number
03-1111-1111

Next

FIG. 10 (b)

Enter poster's e-mail address.

E-mail address
jiro@coolmail.com

E-mail address (confirm)
jiro@coolmail.com

Register

Enter device ID.

Device ID
010001

Next

Create poster's account.

Name
Jiro Yamada

E-mail address
jiro@coolmail.com

Password
********

Password (confirm)
********

Next

Create your child's account.

Nickname
Sub-chan

Gender
Male

Date of birth
2014   4    26
Year  Month  Day

Register

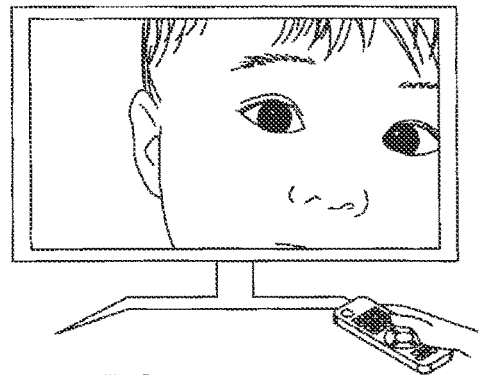
FIG. 14(a)
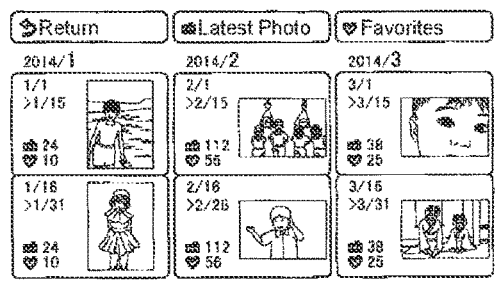
FIG. 14(b)
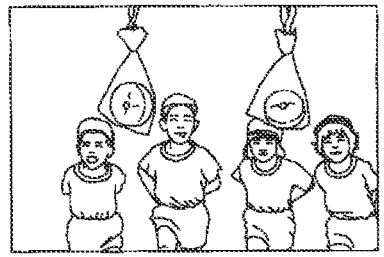
FIG. 14(c)
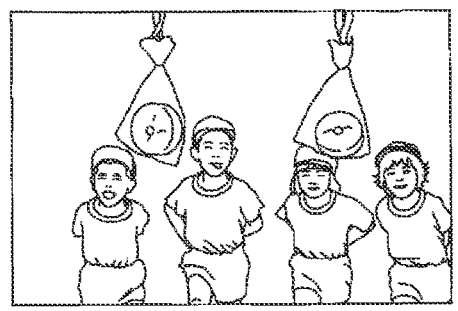
FIG. 14(d)
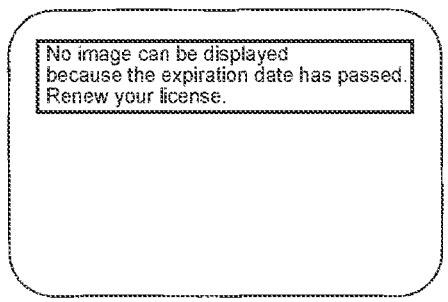
FIG. 14(e)

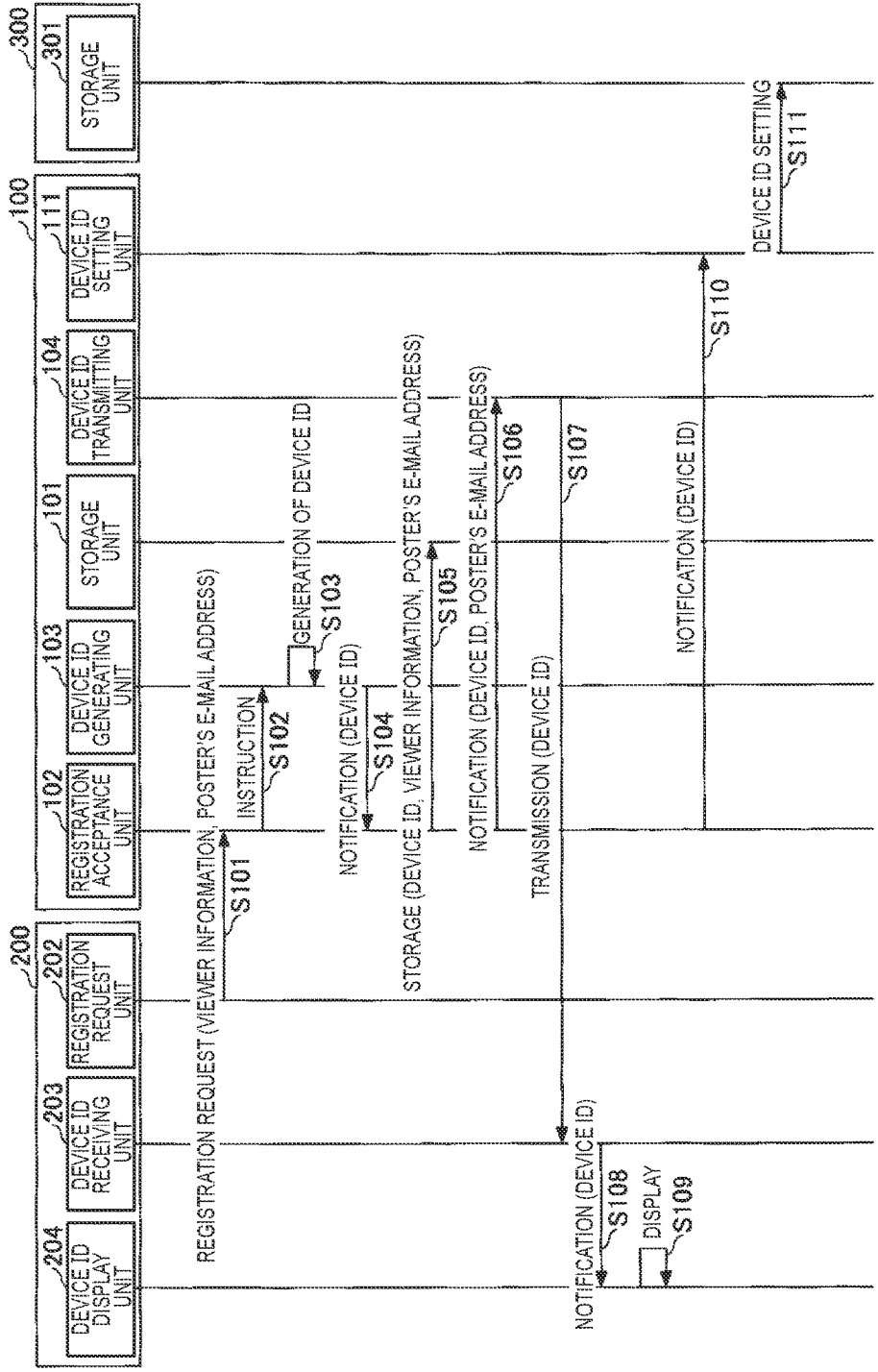

FIG. 20 (a)

| VIEWER'S ID | VIEWER'S NAME | VIEWER'S POSTAL CODE | VIEWER'S ADDRESS | VIEWER'S TELEPHONE NUMBER | DEVICE ID | EXPIRATION DATE |
|---|---|---|---|---|---|---|
| 301 | ICHIRO YAMADA | 111-1111 | 1-1-1 CHIYODA, CHIYODA-KU, TOKYO | 03-1111-1111 | 010001 | 2014/4/30 |
| 302 | TARO TANAKA | 222-2222 | 2-2-2 CHIYODA, CHIYODA-KU, TOKYO | 03-2222-2222 | 010002 | 2014/2/10 |
| : | : | : | : | : | : | : |

FIG. 20 (b)

| POSTER'S ID | POSTER'S NAME | POSTER'S E-MAIL ADDRESS | POSTER'S PASSWORD |
|---|---|---|---|
| 101 | JIRO YAMADA | jiro@coolmail.com | ******** |
| 102 | JIRO TANAKA | jtana@ggmail.com | ******** |
| : | : | : | : |

FIG. 21

| GROUP ID | VIEWER'S ID | POSTER'S ID |
|---|---|---|
| 1 | 301, 302 | 101, 102 |
| 2 | 311, 314 | 105 |
| 3 | 315 | 106, 108, 110 |
| : | : | : |

FIG. 26

| IDENTIFI-CATION NO. | FILE NAME | VIEWING STATE | VIEWING DATE AND TIME | INTERRUPTED POSITION |
|---|---|---|---|---|
| 1001 | newbaby.jpg | VIEWED | 2014/4/15 09:14:15 | – |
| : | : | : | : | : |
| 1003 | newbaby2.mp4 | INTERRUPTED | 2014/4/15 09:15:30 | 00:01:30 |
| 1004 | festival_run.mp4 | VIEWED | 2014/3/20 18:01:19 | – |
| 1005 | festival_dance.mp4 | NOT VIEWED | – | – |
| : | | : | : | : |

160A, 380A

IMAGE MANAGEMENT SYSTEM, MANAGEMENT DEVICE, PROGRAM, AND IMAGE OUTPUT DEVICE

RELATED APPLICATIONS

The present application is a National Phase entry of International Application No. PCT/JP2015/066920, filed Jun. 11, 2015, which claims priority of Japanese Applications No. 2014-122034, filed Jun. 13, 2014 and No. 2014-244469, filed Dec. 2, 2014.

TECHNICAL FIELD

The present invention relates to an image management system, a management apparatus, a program, and an image output device.

BACKGROUND ART

There are services that enable images shot with mobile phones to be transmitted to display devices (e.g., digital photo frames) remotely provided, and be shared with one another. A poster of an image can upload the image using an image management service on the Internet, or transmit the image directly to a display device to share the image with an owner (viewer) of the display device.

Patent Document 1 discloses a technique which, when a network connection of an image display device is confirmed, delivers image data, stored in an image management server as being addressed to the image display device, automatically to the image display device.

CITATION LIST

Patent Document

Patent Document 1: Japanese Patent Application Laid-Open No. 2011-118858

SUMMARY

Technical Problem

However, the conventional technique requires a poster to transmit an image manually in order to share the image after the image is acquired by shooting.

Further, since there is a need for a viewer to set up the display device in advance, the viewer is required to have a certain degree of knowledge about the display device or the network. This causes a problem that it is difficult for a viewer who does not have such a certain degree of knowledge to use the conventional image sharing service.

The present invention has been made in view of such a problem, and it is an object thereof to enable images to be shared easily.

Solution to Problem

In order to solve the above problem and attain the object, an image management system in one embodiment of the present invention is an image management system having an image output device communicable with a management apparatus and a display device, wherein the management apparatus includes:
a generation unit that generates an identifier of the image output device in response to a request from a communication terminal;
a first transmission unit that transmits the identifier to the communication terminal;
an authentication unit that authenticates the communication terminal using the identifier transmitted from the communication terminal;
a first reception unit that receives image data from the authenticated communication terminal; and
a second transmission unit that transmits the received image data to the image output device, and the image output device includes:
a second reception unit that receives the transmitted image data; and
an output unit that outputs, to the display device, the image data received by the second reception unit.

A management apparatus in one embodiment of the present invention includes:
a generation unit that generates an identifier of an image output device communicable with a display device in response to a request from a communication terminal;
a first transmission unit that transmits the identifier to the communication terminal;
an authentication unit that authenticates the communication terminal using the identifier transmitted from the communication terminal;
a first reception unit that receives image data from the authenticated communication terminal; and
a second transmission unit that transmits the received image data to the image output device to cause the image output device to output the image data to the display device.

A program in one embodiment of the present invention causes a computer to execute:
a generation step of generating an identifier of an image output device communicable with a display device in response to a request from a communication terminal;
a first transmission step of transmitting the identifier to the communication terminal;
an authentication step of authenticating the communication terminal using the identifier transmitted from the communication terminal;
a first reception step of receiving image data from the authenticated communication terminal; and
a second transmission step of transmitting the received image data to the image output device to cause the image output device to output the image data to the display device.

An image output device in one embodiment of the present invention is
an image output device communicable with a display device and a management apparatus, including:
a storage unit that stores an identifier generated by the management apparatus in response to a request from a communication terminal;
a reception unit that receives image data transmitted from the communication terminal authenticated using the identifier;
an acquisition unit that acquires a control signal transmitted from the display device in response to input accepted by a remote control device of the display device; and an output unit that outputs the image data to the display device when the acquisition unit acquires the control signal corresponding to selection of the image data.

Advantageous Effects of Invention

According to the present invention, images can be shared easily.

BRIEF DESCRIPTION OF DRAWINGS

FIG. 7 is a diagram representing an example of a table to store user information.

FIG. 8 is a diagram representing an example of a table to store image management information.

FIG. 9(a) and FIG. 9(b) are diagrams representing example tables to store control signal information.

FIG. 10(a) and FIG. 10(b) are diagrams representing example viewer information registration screens.

FIG. 12(a)-FIG. 12(c) are diagrams representing example poster information registration screens.

FIG. 14(a)-FIG. 14(e) are diagrams representing example image viewing screens.

FIG. 16 is a sequence diagram representing a viewer information registration process.

FIGS. 20(a) and 20(b) are diagrams representing example tables to store user information.

FIG. 21 is a diagram representing an example of a table to store group information.

FIG. 26 is a diagram representing an example of a table to store image management information.

DESCRIPTION OF EMBODIMENTS

Embodiments of the present invention will be described below with reference to the accompanying drawings.

Figure 1:
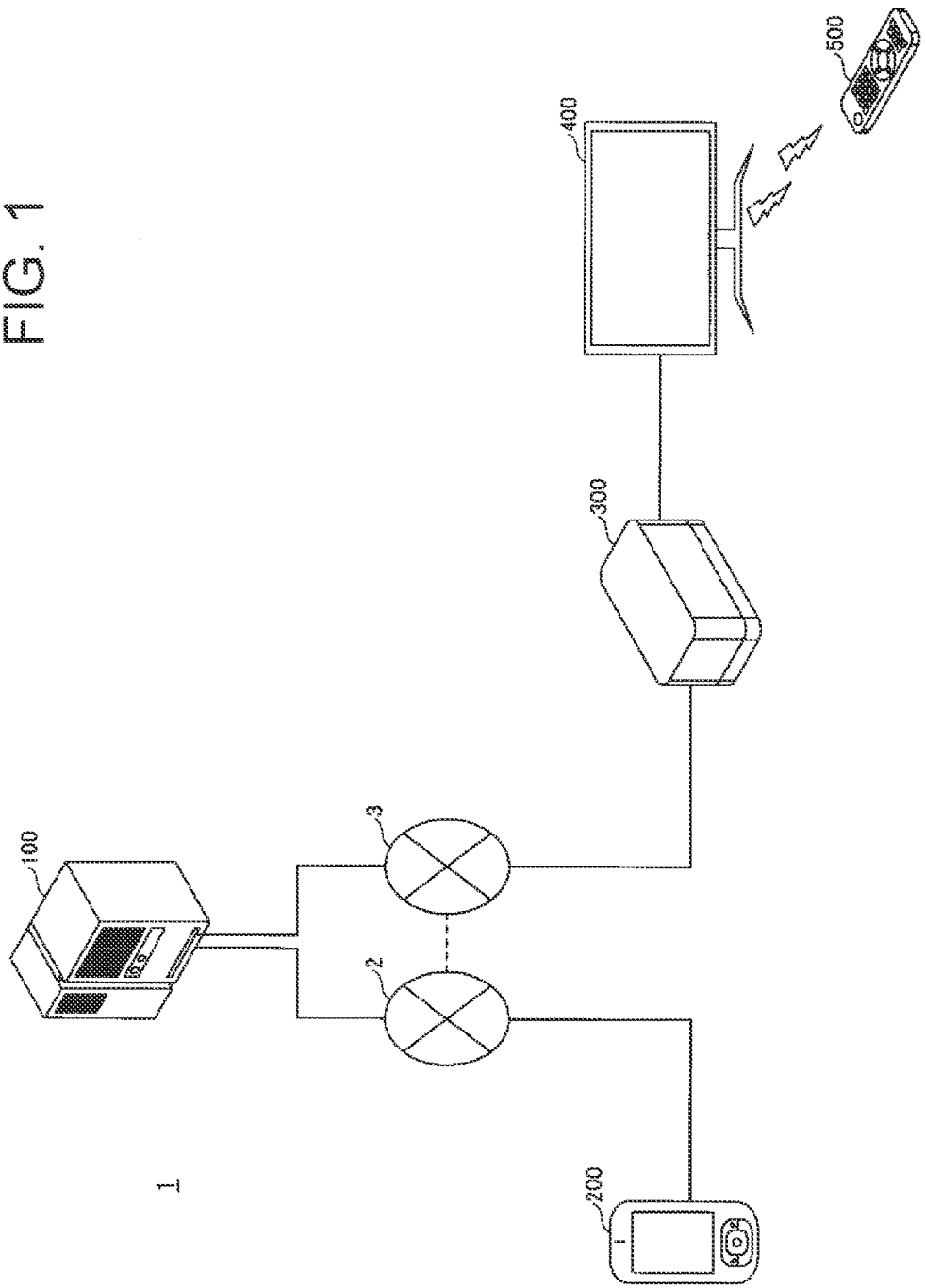
FIG. 1 is a diagram for describing a system outline in one embodiment of the present invention.

1. System Outline
2. Hardware Configurations
2.1 Management Apparatus
2.2 Communication Terminal
2.3 Image Output Device
3. Functions
3.1 Management Apparatus
3.2 Communication Terminal
3.3 Image Output Device
4. Operation Examples
4.1 Viewer Information Registration Process
4.2 Image Delivery Process
4.3 Image Output Process and Rating Process
4.4 Deadline Management Process
5. Advantageous Effects
6. Application Examples 1. System Outline FIG. 1 is a diagram for describing an outline of a system 1 in one embodiment of the present invention. The system 1 illustrated in FIG. 1 is a system for managing images, which includes a management apparatus 100, a communication terminal 200, and an image output device 300. The image output device 300 is connected to a display device 400, and the display device 400 is controlled by a remote control device 500.

The management apparatus 100 and the communication terminal 200 are communicable with each other through a network 2, such as a wireless LAN, the fourth-generation communication system (4G), or LTE (Long Term Evolution). The management apparatus 100 and the image output device 300 are communicable with each other through a wireless network 3, such as the third-generation mobile communication system (3G), cheaper in communication fee but lower in speed than the network 2. Note that the network 2 and the wireless network 3 are illustrated distinctively for illustrative purposes, but these networks can be connected to each other via the Internet.

The management apparatus 100 first acquires information on the name, address, and the like of a viewer of an image from a poster of the image through a website on the Internet. At this time, the management apparatus 100 generates an identifier (called a device ID) of the image output device 300 used by the viewer. Then, the device ID is notified to the poster of the image, for example, through e-mail.

The management apparatus 100 sets the generated device ID in the image output device 300. After that, the image output device 300 is shipped to the address of the viewer of the image by an administrator of the management apparatus 100. For example, the image output device 300 incorporates a 3G communication module, and is configured to start communication with the management apparatus 100 using the set device ID immediately after power-on.

On the other hand, the poster of the image downloads an application running on a communication terminal 200, such as a smartphone or a tablet, to share the image. This application uses the notified device ID to access the management apparatus 100. The management apparatus 100 can use the device ID notified from the application as a key to associate the communication terminal 200 (poster) with the image output device 300 (viewer).

After that, the poster can shoot various subjects using the application. The application transmits image data acquired by shooting automatically to the management apparatus 100 through the network 2. The poster is not required to carry out any special operation in order to transmit the image data to the management apparatus 100.

The management apparatus 100 accumulates image data transmitted from the application of the communication terminal 200, and delivers the image data sequentially to the image output device 300. The image output device 300 displays the image data on the display device 400 in response to an instruction from the viewer.

Here, the display device 400 is, for example, a TV set popular for standard home use, and the remote control device 500 is a remote controller. The image output device 300 can be connected to the display device 400, for example, through an HDMI (High-Definition Multimedia Interface) (registered trademark) to acquire a control signal from the remote control device 500 through the HDMI.

The image output device 300 can acquire the control signal from the remote control device 500 to grasp the content of an input operation of the viewer. In other words, the viewer can use a familiar TV remote control to view delivered image data.

Figure 2:
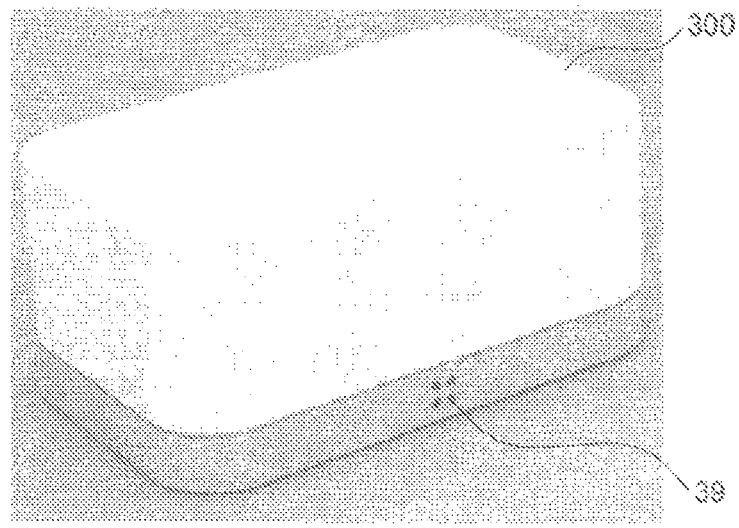
FIG. 2(a) and FIG. 2(b) are diagrams representing the appearance of an image output device in one embodiment of the present invention.
Figure 2:
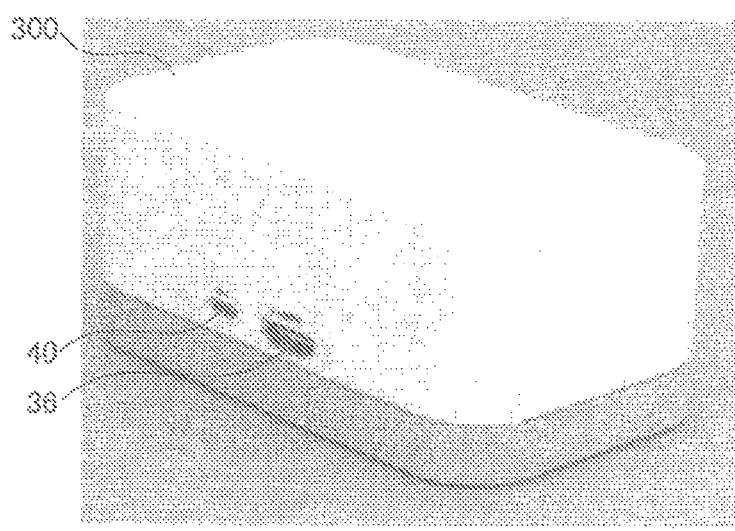

FIGS. 2(*a*) and 2(*b*) are diagrams representing the appearance of the image output device 300 in one embodiment of the present invention. FIG. 2 (*a*) is a perspective view of the image output device 300 as seen from the front. As illustrated in FIG. 2 (*a*), the image output device 300 has an LED lamp 39 that lights up or blinks at power-on or at the time of access.

FIG. 2 (*b*) is a perspective view of the image output device 300 as seen from the rear. As illustrated in FIG. 2 (*b*), the image output device 300 has an HDMI terminal 36 and a power cable connecting port 40. Thus, the image output device 300 is designed to have only minimal interfaces to enable a viewer unfamiliar with electronic devices to handle the image output device 300 easily. The viewer can start using the image output device 300 only by connecting the power cable and the HDMI cable.

The above-mentioned configuration enables easy image sharing without knowledge about the display device and the network between the poster and the viewer located remotely from each other.

2. Hardware Configurations

The hardware configurations of the management apparatus 100, the communication terminal 200, and the image output device 300 in one embodiment of the present invention will be described with reference to FIG. 3 to FIG. 5.

<2.1 Management Apparatus>

Figure 3:
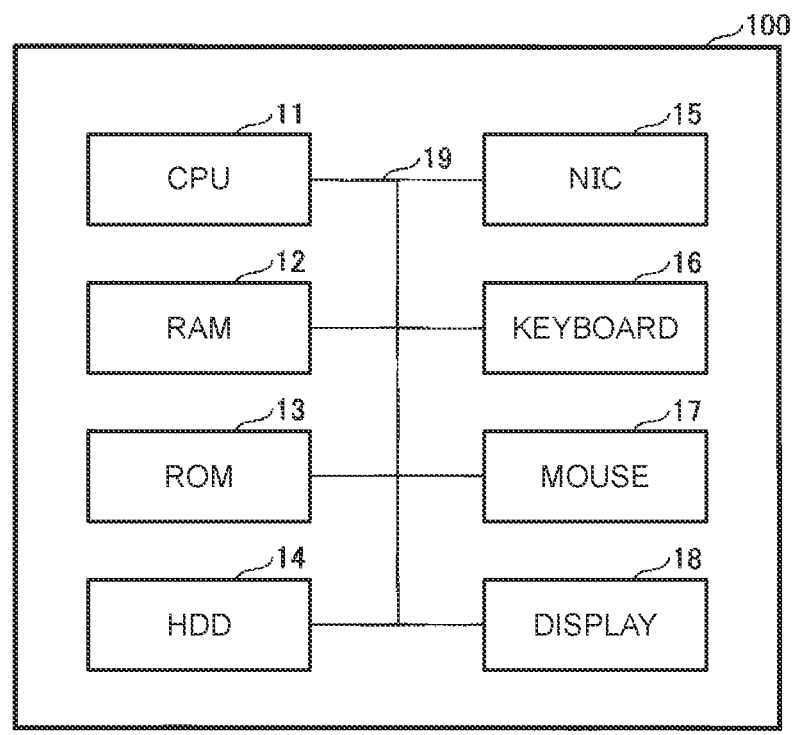
FIG. 3 is a hardware configuration diagram of a management apparatus in one embodiment of the present invention.

FIG. 3 is a hardware configuration diagram of the management apparatus 100 in one embodiment of the present invention. The management apparatus 100 has a CPU 11, a RAM (Random Access Memory) 12, a ROM (Read Only Memory) 13, a HDD (Hard Disk Drive) 14, a NIC (Network Interface Card) 15, a keyboard 16, a mouse 17, and a display 18. The respective units are connected via a bus 19.

The CPU 11 executes a program that controls the management apparatus 100. The RAM 12 functions as a work area of the CPU 11. The ROM 13 stores a system program executed upon startup of the management apparatus 100, and data necessary to execute the system program. The HDD 14 stores image data received from an image poster and management information necessary to manage the image data in addition to a program that configures an OS (Operating System) and user's applications.

The NIC 15 is a unit as an interface used to connect to a LAN (Local Area Network). The keyboard 16 and the mouse 17 are units used to accept input from the administrator. The display 18 is a unit used to present information to the administrator.

Note that the management apparatus 100 is configured by using a typical server computer. The management apparatus 100 may also be realized by multiple distributed computers. The management apparatus 100 can read, into the RAM 12, a program located in the ROM 13, the HDD 14, or a network to execute the program using the CPU 11 in order to implement functions to be described later. The management apparatus 100 may also store the image data and the management information in a cloud storage area provided through a network, instead of storing them in the HDD 14. Further, when the management apparatus 100 is a server for providing functions to a client terminal used by the administrator, the management apparatus 100 may not have the keyboard 16, the mouse 17, and the display 18.

<2.2 Communication Terminal>

Figure 4:
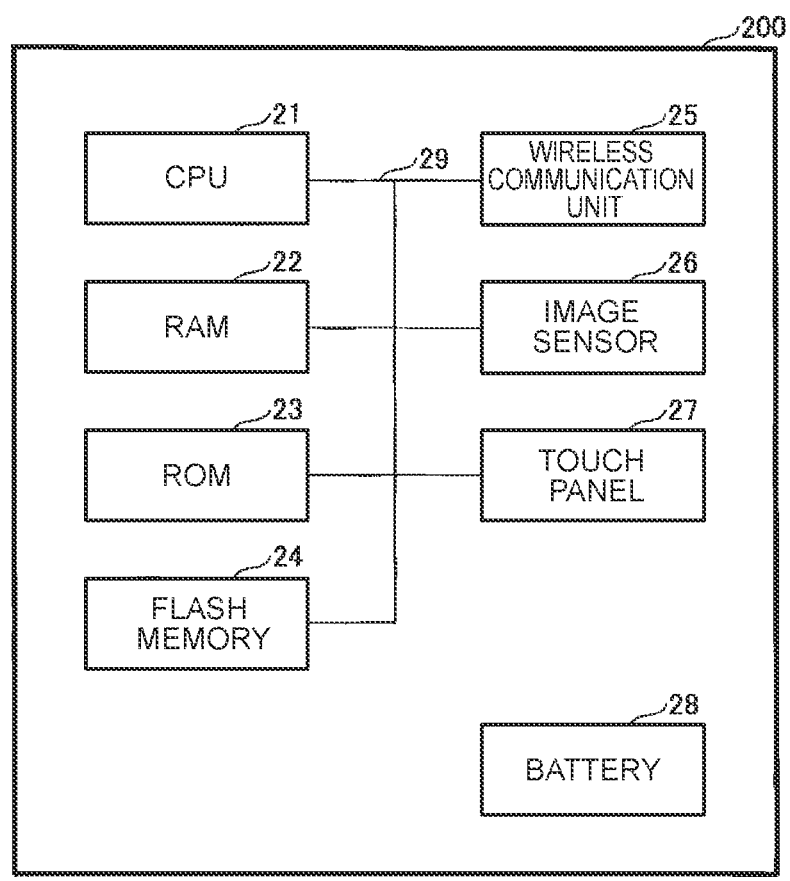
FIG. 4 is a hardware configuration diagram of a communication terminal in one embodiment of the present invention.

FIG. 4 is a hardware configuration diagram of the communication terminal 200 in one embodiment of the present invention. The communication terminal 200 has a CPU 21, a RAM 22, a ROM 23, a flash memory 24, a wireless communication unit 25, an image sensor 26, a touch panel 27, and a battery 28. All units but the battery 28 are connected via a bus 29.

The CPU 21 executes a program that controls the communication terminal 200. The RAM 22 functions as a work area of the CPU 21. The ROM 23 stores a system program executed upon startup of the communication terminal 200, and data necessary to execute the system program. The flash memory 24 stores a program that configures an OS, an application for image sharing, image data acquired by shooting, and the like.

The wireless communication unit 25 is a unit as an interface for connection to the network 2 such as wireless LAN, 4G, or LTE. The image sensor 26 is a unit that forms an image of light from a target object on an imaging element and converts the image to an electric signal to acquire image data. The touch panel 27 is an electronic component made up of a combination of a liquid crystal panel and a touch pad, which is an input device that accepts an operation to press a display on the screen. The battery 28 is a rechargeable battery that supplies power to the communication terminal 200.

The communication terminal 200 is, for example, a portable information processing terminal such as a smartphone or a tablet. The communication terminal 200 may also be any other information processing terminal having the wireless communication unit 25 and the image sensor 26 (e.g., a laptop, a PDA (Personal Digital Assistant), a digital camera, a digital camcorder, or a wearable device worn on a body).

Note that the communication terminal 200 may store image data acquired by shooting, for example, in a cloud storage area provided through the network, instead of storing the image data in the flash memory 24. Further, the communication terminal 200 may have hardware keys like operation buttons and a display, instead of having the touch panel 27.

<2.3 Image Output Device>

Figure 5:
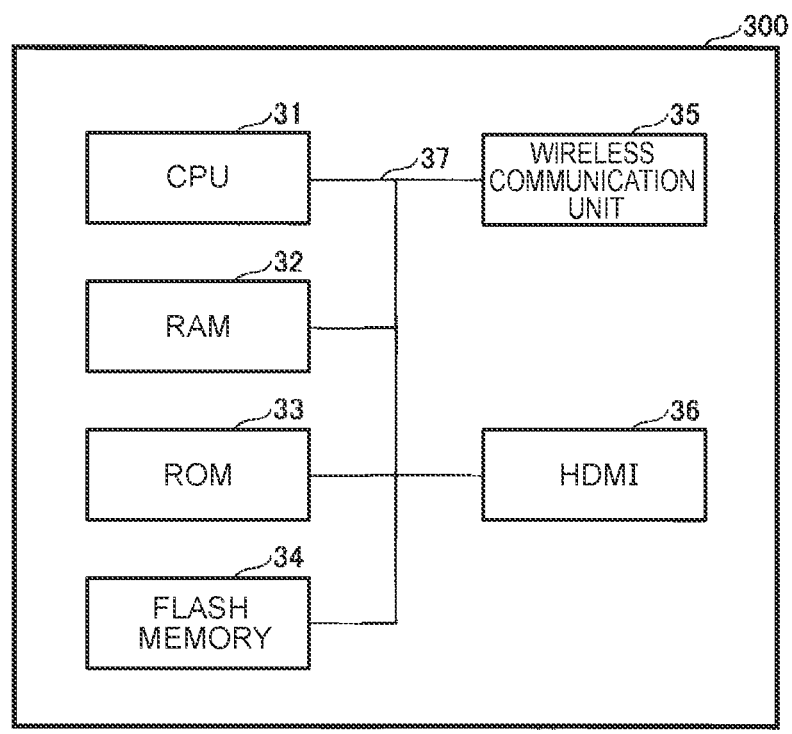
FIG. 5 is a hardware configuration diagram of the image output device in one embodiment of the present invention.

FIG. 5 is a hardware configuration diagram of the image output device 300 in one embodiment of the present invention. The image output device 300 has a CPU 31, a RAM 32, a ROM 33, a flash memory 34, a wireless communication unit 35, and an HDMI 36. The respective units are connected via a bus 37.

The CPU 31 executes a program that controls the image output device 300. The RAM 32 functions as a work area of the CPU 31. The ROM 33 stores a system program executed upon startup of the image output device 300, and data necessary to execute the system program. The flash memory 34 stores a program that configures an OS, an application for image sharing, image data received from the management apparatus 100, and the like.

The wireless communication unit 35 is a unit as an interface used to connect to the wireless network 3 such as 3G. The HDMI 36 is an interface for digital home appliances, which can transmit and receive control signals to and from the display device 400 to be connected.

The image output device 300 is a portable information processing device having a housing as illustrated in FIGS. 2(a)-2(b). It is preferred that the image output device 300 should have only minimal interfaces not to make the viewer of an image confused about operations. In the example illustrated in FIGS. 2(a)-2(b), the image output device 300 does not have any operation button. Therefore, even if the viewer is unfamiliar to machine operations, the viewer can handle the image output device 300 without feeling challenged.

Since the image output device 300 is assumed to be used at viewer's residence or office where no wireless network such as a wireless LAN is established, the image output device 300 includes the 3G wireless communication unit 35 whose service area is wide and communication charge is low. However, the image output device 300 may include a faster wireless communication unit compliant with 4G or LTE communication to communicate with the management apparatus 100.

Further, the image output device 300 may include a wireless communication unit compliant with wireless LAN or WAN (Wide Area Network) to communicate with the management apparatus 100. Further, the image output device 300 may include a wireless communication unit using near field communication, such as Bluetooth (registered trademark) or ZigBee (registered trademark), to communicate with the management apparatus 100. Further, the image output device 300 may have a NIC for wired LAN connection instead of the wireless communication unit 35 to communicate with the management apparatus 100.

Note that the image output device 300 may be incorporated in a digital TV set, a home game machine, a cable TV tuner, or a Blu-ray disk or DVD (Digital Versatile Disk) recorder or player. Further, the image output device 300 may include an HDD instead of including the flash memory 34. In addition, the image output device 300 may store data such as image data in a cloud storage area.

3. Functions

Figure 6:
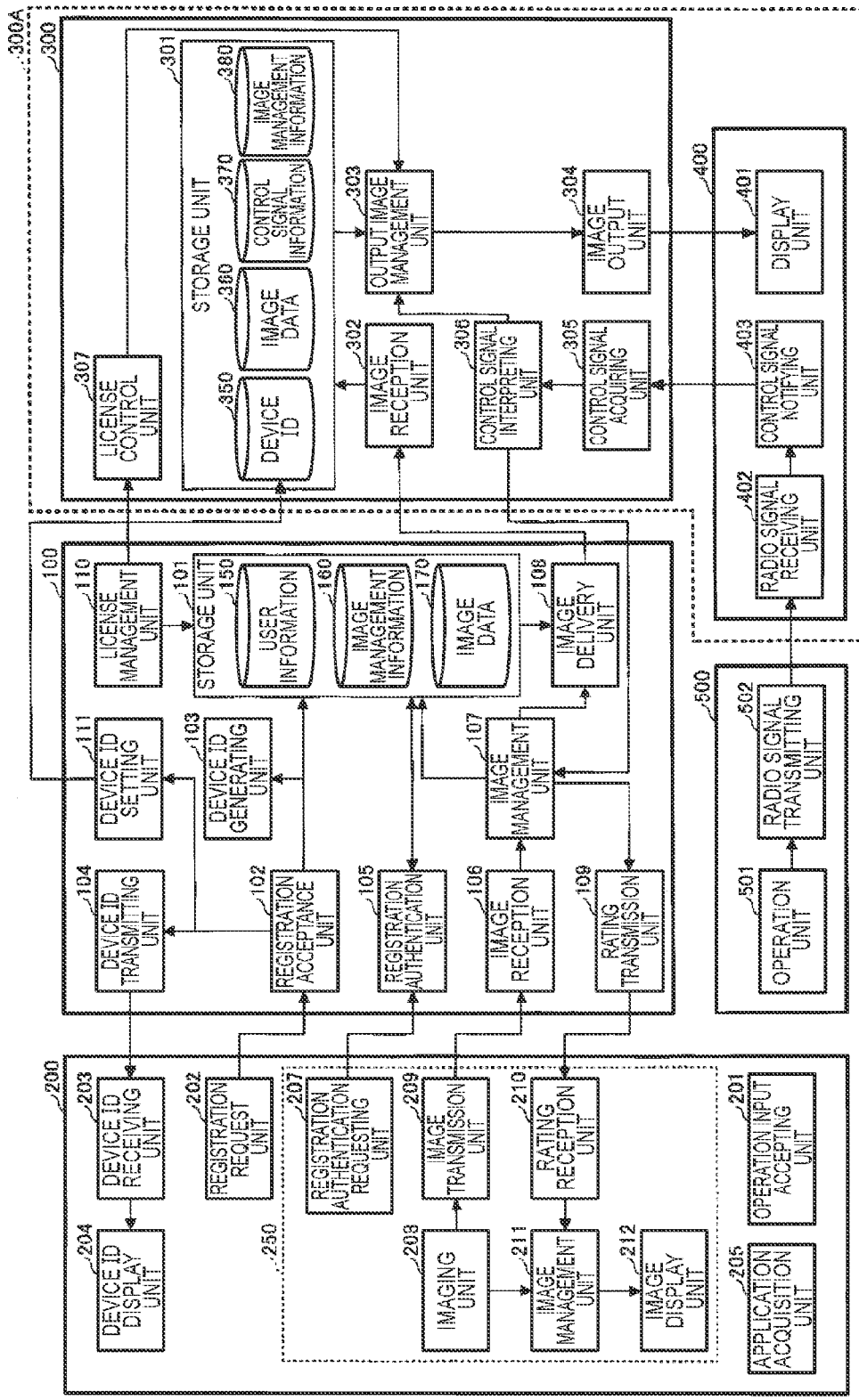
FIG. 6 is a functional block diagram of the system in one embodiment of the present invention.

FIG. 6 is a functional block diagram of the system 1 in one embodiment of the present invention.

<3.1 Management Apparatus>

The management apparatus 100 in one embodiment of the present invention has a storage unit 101, a registration acceptance unit 102, a device ID generating unit 103, a device ID transmitting unit 104, a registration authentication unit 105, an image reception unit 106, an image management unit 107, an image delivery unit 108, a rating transmission unit 109, a license management unit 110, and a device ID setting unit 111.

The storage unit 101 is realized by the HDD 14 illustrated in FIG. 3 to store information such as user information 150, image management information 160, and image data 170.

The user information 150 is information in which image's poster information and viewer information are stored in association with each other.

FIG. 7 is a diagram representing an example of a table to store the user information 150. As illustrated in FIG. 7, the user information 150 has the following items: identification number, viewer's name, viewer's postal code, viewer's address, viewer's telephone number, device ID, expiration date, poster's name, poster's e-mail address, and poster's password.

The identification number is a number used to identify each entry of the table that stores the user information 150. The viewer's name is the name of a user (viewer) who uses the image output device 300. The viewer's postal code and the viewer's address are the address of the viewer. The viewer's telephone number is the telephone number of the viewer. The viewer's name, the viewer's postal code, the viewer's address, and the viewer's telephone number are used to ship, to the viewer, the image output device 300 with a device ID set. These pieces of information are also used for license management related to the right of the viewer to use the image output device 300. The identification number may also be used as an ID to identify the viewer, and may be registered in the image output device 300 used by the viewer.

The device ID is a unique identifier assigned to the image output device 300. The expiration date represents the expiration date to use the functions of the image output device 300. The poster's name is the name of a poster who performs shooting using the communication terminal 200 and posts an acquired image. The poster's e-mail address is the e-mail address of the poster used to give notice of information from the management apparatus 100 and to authenticate the communication terminal 200 by the management apparatus 100. The poster's password is a password assigned by the poster and used by the management apparatus 100 to authenticate the communication terminal 200.

Note that the user information 150 may further have other items that are not illustrated in FIG. 7.

The image management information 160 is information used to manage images posted by each poster using the communication terminal 200. The image management information 160 is configured for each entry in the table of the user information 150.

FIG. 8 is a diagram representing an example of a table to store the image management information 160. As illustrated in FIG. 8, the image management information 160 has the following items: identification number, file name, title, shooting date, delivery state, number of ratings, and number of views.

The identification number is a number used to identify each entry of the table that stores the image management information 160. The file name is the name of image data (file) on each image posted by the poster. The file name may include information on a path to the file. The title is a title set for each image data. The shooting date represents the date of shooting the image.

The delivery state represents whether the image data are delivered to the image output device 300. Here, the term "not yet" represents an undelivered state of the image data, and the term "done" represents a delivered state of the image data. The number of ratings represents the degree of rating (rating value) by the viewer for the posted image. The number of views represents the number of times the viewer viewed the posted image.

Note that the image management information 160 may further have other items that are not illustrated in FIG. 8.

The registration acceptance unit 102 is implemented mainly by processing of the CPU 11 and the NIC 15 illustrated in FIG. 3 to accept a registration request from a terminal used by a user via a website. In the embodiment, the user means a poster who desires to post an image and share the image with a viewer. Further, the terminal may be the communication terminal 200 used by the poster, or any other terminal capable of displaying the website.

FIGS. 10(a)-10(b) represent example output screens (viewer information registration screens) of a website provided by the registration acceptance unit 102. First, as illustrated in FIG. 10(a), the registration acceptance unit 102 urges a user as a viewer of an image to enter the name, the postal code, the address, and the telephone number via the screen as a shipping destination of the image output device 300. Further, as illustrated in FIG. 10(b), the registration acceptance unit 102 urges the user to enter the e-mail address of a user as a poster of the image. Then, the registration acceptance unit 102 urges the user to select a "register" button in FIG. 10(b) to receive a registration request including the above-mentioned information.

Note that although FIGS. 10(a)-10(b) represent example screens for a smartphone or a tablet, screens in a different format can be output to a laptop or any other device. The same applies to output screens to be described in examples below.

When receiving the registration request, the registration acceptance unit 102 instructs the device ID generating unit 103 to create a device ID. Then, the registration acceptance unit 102 acquires the generated device ID.

When receiving the registration request, the registration acceptance unit 102 creates a new entry in the table to store the user information 150. At this time, the registration acceptance unit 102 sets, as the identification number, a new number distinct from the other entries. Then, the registration acceptance unit 102 stores the acquired viewer's name, postal code, address, and telephone number in the items of viewer's name, viewer's postal code, viewer's address, and viewer's telephone number of the table, respectively. Further, the registration acceptance unit 102 stores the acquired e-mail address in the item of poster's e-mail address of the table. Further, the registration acceptance unit 102 stores the generated device ID in the item of device ID of the table.

The registration acceptance unit 102 notifies the device ID transmitting unit 104 of the generated device ID, and the acquired poster's e-mail address. Further, the registration acceptance unit 102 notifies the device ID setting unit 111 of the generated device ID.

The device ID generating unit 103 is implemented by processing of the CPU 11 in FIG. 3 to generate a device ID as a unique identifier of the image output device 300 in response to the instruction from the registration acceptance unit 102. The device ID generating unit 103 notifies the registration acceptance unit 102 of the generated device ID. The device ID may be a combination of any characters and numerals.

The device ID transmitting unit 104 is implemented by processing of the CPU 11 and the NIC 15 illustrated in FIG. 3 to give notice of the device ID received from the registration acceptance unit 102 to the poster's e-mail address received from the registration acceptance unit 102 as well.

Figure 11:
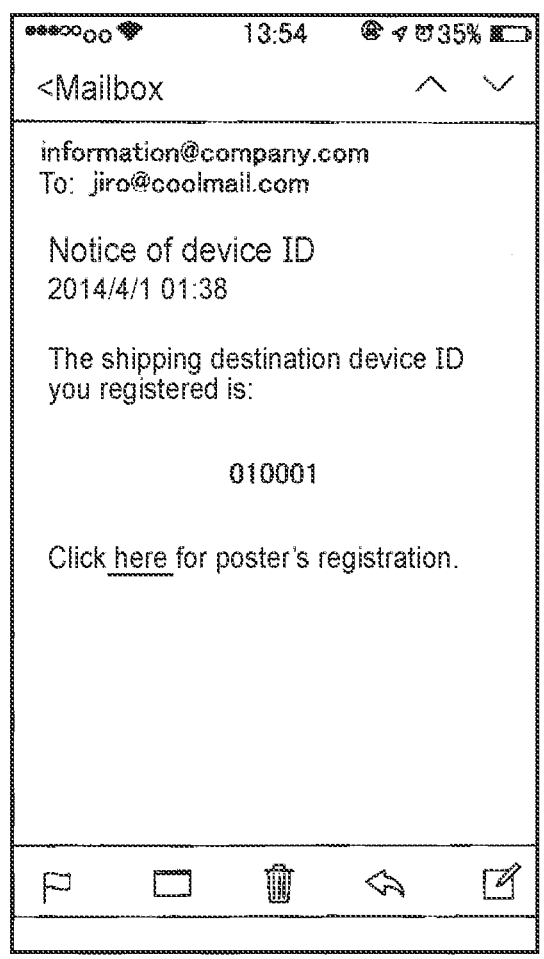
FIG. 11 is a diagram representing an example of e-mail used to give notice of a device ID.

FIG. 11 is a diagram representing an example of e-mail used to give notice of the device ID. From this notice mail, the poster of the image can know the device ID of the image output device 300 used by the viewer. As illustrated in FIG. 11, a link used for poster registration may be provided in the text of the mail. The poster can click this link to access a download site of an application 250 for image sharing. The poster installs the application 250 on the communication terminal 200 to undergo authentication by the management apparatus 100 using the notified device ID so that the poster can post the image.

The registration authentication unit 105 is implemented by processing of the CPU 11 illustrated in FIG. 3, having a function to accept a registration request from the application 250 on an unregistered communication terminal 200 and a function to accept an authentication request from a registered communication terminal 200.

When receiving the device ID, and the poster's name, e-mail address and password together with the registration request from the application 250 on the unregistered communication terminal 200, the registration authentication unit 105 checks whether there is an entry having the same device ID as the received device ID in the user information 150. Then, when there is the entry, the registration authentication unit 105 stores the received poster's name and password in the items of poster's name and poster's password of the table of the user information 150, respectively. On the other hand, when there is no entry, the registration authentication unit 105 may present an error message to the poster to inform the poster to that effect.

When there is the entry having the same device ID as the received device ID, the registration authentication unit 105 may further check whether the poster's e-mail address stored in the entry matches the received e-mail address. Then, when the received e-mail address and the e-mail address stored in the user information 150 do not match each other, the registration authentication unit 105 may stop the registration process and present an error message to the poster to inform the poster to that effect.

FIGS. 12(a)-12(c) represent example output screens (poster information registration screens) of the application 250 on the communication terminal 200, which are displayed to urge the poster to enter the above-mentioned information. FIG. 12(a) is to urge input of the device ID, FIG. 12(b) is to urge input of the poster's name, e-mail address, and password, and FIG. 12(c) is to urge input of information as additional information, such as a nickname for a poster's child as a subject, and the like. The registration authentication unit 105 can receive, from the application 250 on the communication terminal 200, the registration request together with information entered via such screens.

Note that the registration authentication unit 105 may acquire the above-mentioned information via an input form on a website provided by the registration authentication unit 105, instead of using the application 250 on the communication terminal 200.

When receiving the e-mail address and the password together with the authentication request from the application 250 on the registered communication terminal 200, the registration authentication unit 105 checks whether the combination is registered in the user information 150 as the poster's e-mail address and the poster's password. Then, when the combination of the e-mail address and the password is registered, the registration authentication unit 105 notifies the application 250 of successful authentication. On the other hand, when the combination of the e-mail address and the password is not registered, the registration authentication unit 105 notifies the application 250 of failed authentication.

Figure 13:
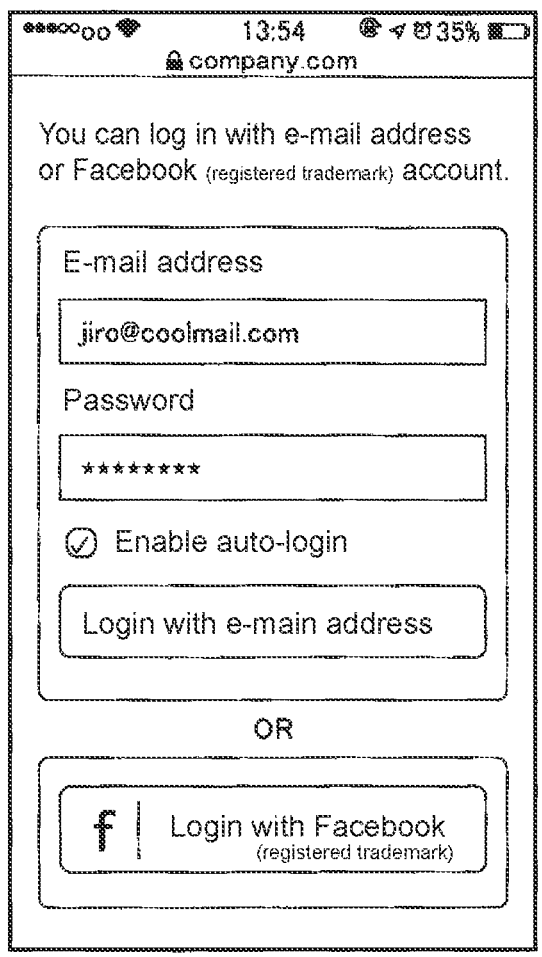
FIG. 13 is a diagram representing an example of a poster authentication screen.

FIG. 13 represents an example of an output screen (poster authentication screen) of the application 250 on the communication terminal 200, which is displayed to urge the poster to enter the e-mail address and the password. The registration authentication unit 105 can receive, from the application 250, the authentication request together with the e-mail address and the password input via such a screen. In the example illustrated in FIG. 13, the poster can login with a Facebook (registered trademark) account in addition to the combination of the e-mail address and the password.

The image reception unit 106 is implemented mainly by processing of the CPU 11 and the NIC 15 illustrated in FIG. 3 to receive image data from the application 250 on the communication terminal 200 the registration and authentication of which are completed. The image reception unit 106 passes the received image data to the image management unit 107. Note that the image data include video typified by the MPEG or MOV format as well as still images typified by JPEG, GIF, PNG, and the like.

The image management unit 107 is implemented by processing of the CPU 11 illustrated in FIG. 3 to manage image data acquired via the communication terminal 200 of the poster.

When receiving new image data from the image reception unit 106, the image management unit 107 first creates a new entry in the table of the image management information 160. Next, the image management unit 107 stores the image data received from the image reception unit 106 in the storage unit 101 as image data 170. Further, the image management unit 107 reads the image data to acquire information such as the title of the image data and the shooting date. Then, the image management unit 107 stores, in the generated entry of the image management information 160, a file name of the stored image data and the information such as the title and the shooting date acquired from each image data.

In an entry among entries newly generated in the table of the image management information 160, the image management unit 107 sets the item of identification number to a new number that does not overlap that of any other entry, the item of delivery state to "not yet," the item of number of ratings to "0," and the item of number of views to "0."

Further, the image management unit 107 instructs the image delivery unit 108 to deliver the newly received image data to the image output device 300. The image management unit 107 delivers the image data to the viewer's image output device 300 having the device ID associated with the poster's e-mail address identified by the authentication. The image management unit 107 can deliver the image data to the image output device 300 using, for example, a network address (e.g., IP address) associated with the device ID. After confirming that the image data were delivered to the image output device 300, the image management unit 107 sets the item of delivery state in the image management information 160 to "done."

When receiving a notification from the image output device 300 that certain image data are rated, the image management unit 107 increments the number of ratings corresponding to the image data in the image management information 160 by one. Further, the image management unit 107 instructs the rating transmission unit 109 to notify the application 250 on the communication terminal 200 that the image data are rated, together with the current number of ratings of the image data.

Note that when receiving image data from the communication terminal 200, the image management unit 107 may create several kinds of image data different in size and resolution. For example, the image management unit 107 may create image data having a size suitable for display on the display device 400 that displays the image data later. The image management unit 107 may also create two or more thumbnail images different in size and resolution to be displayed on a menu or an image selection screen. These pieces of image data can be handled in combination with the original image data received from the communication terminal 200, and delivered to the image output device 300 together with the original image data.

The image management unit 107 can provide an API (Application Programming Interface) for an external device such as the communication terminal 200 or the display device 400 to execute the above-mentioned function in response to an instruction from the external device. Thus, the image management unit 107 can provide the above-mentioned function not only for the communication terminal 200 and the display device 400 described in the embodiment, but also for any other external device operating according to the API.

The image delivery unit 108 is implemented mainly by processing of the CPU 11 and the NIC 15 illustrated in FIG. 3 to deliver image data to the image output device 300 through the wireless network 3 in response to the instruction from the image management unit 107.

The rating transmission unit 109 is implemented mainly by processing of the CPU 11 and the NIC 15 illustrated in FIG. 3 to notify the application 250 on the communication terminal 200 that the image data are rated, together with the current number of ratings of the image data, in response to the instruction from the image management unit 107.

The license management unit 110 is implemented by processing of the CPU 11 illustrated in FIG. 3 to manage the period of license validity to use the image output device 300. The license management unit 110 can manage the expiration date of each image output device 300 using the item of expiration date of the user information 150. For example, the license management unit 110 renews the expiration date in response to renewal payment from the viewer that received the image output device 300.

For example, the license management unit 110 checks the expiration date of each image output device 300 stored in the table of the user information 150 periodically, and when the expiration date comes up in a certain period of time, the license management unit 110 notifies the image output device 300 to output a warning message. Further, when the expiration date has passed, the license management unit 110 notifies the image output device 300 to that effect to disable the functions of the image output device 300.

The device ID setting unit 111 is implemented by processing of the CPU 11 illustrated in FIG. 3 to set the device ID notified from the registration acceptance unit 102 in the image output device 300 before being shipped to the viewer. For example, the device ID setting unit 111 can set the device ID notified from the registration acceptance unit 102 in any image output device 300 temporarily connected to a LAN with the management apparatus 100 installed therein. The device ID setting unit 111 may also set the device ID in one image output device 300 selected by the administrator of the management apparatus 100.

<3.2 Communication Terminal>

The communication terminal 200 in one embodiment of the present invention has an operation input accepting unit 201, a registration request unit 202, a device ID receiving unit 203, a device ID display unit 204, an application acquisition unit 205, a registration authentication requesting unit 207, an imaging unit 208, an image transmission unit 209, a rating reception unit 210, an image management unit 211, and an image display unit 212.

The operation input accepting unit 201 is implemented mainly by processing of the CPU 21 and the touch panel 27 illustrated in FIG. 4 to accept operation input from the poster.

The registration request unit 202 is implemented mainly by processing of the CPU 21 and the wireless communication unit 25 illustrated in FIG. 4. The registration request unit 202 transmits, to the registration acceptance unit 102 of the management apparatus 100, a registration request entered by the user via the viewer information registration screen illustrated in FIGS. 10(a)-10(b), together with the viewer's name, postal code, address, and telephone number, and the poster's e-mail address.

The device ID receiving unit 203 is implemented mainly by processing of the CPU 21 and the wireless communication unit 25 illustrated in FIG. 4 to receive e-mail transmitted from the device ID transmitting unit 104 of the management apparatus 100 to give notice of a device ID.

The device ID display unit 204 is implemented mainly by processing of the CPU 21 and the touch panel 27 illustrated in FIG. 4 to display, on the touch panel 27, the e-mail received by the device ID receiving unit 203 (FIG. 11).

The application acquisition unit 205 is implemented mainly by processing of the CPU 21 and the wireless communication unit 25 illustrated in FIG. 4 to acquire the application 250 used to share images according to operations of a user (poster) who uses the communication terminal 200. For example, the application acquisition unit 205 downloads an application appropriate to the communication terminal 200 from a dedicated distribution website through the network 2. Note that the functions from the registration authentication requesting unit 207 to the image display unit 212 to be described below are functions provided as part of the application 250.

The registration authentication requesting unit 207 is implemented mainly by processing of the CPU 21 and the wireless communication unit 25 illustrated in FIG. 4. The registration authentication requesting unit 207 transmits, to the registration authentication unit 105 of the management apparatus 100, the device ID, the poster's name, e-mail address, and password, and the like, entered by the user via the poster information registration screen illustrated in FIGS. 12(a)-12(c) to perform the registration process.

The registration authentication requesting unit 207 also transmits, to the registration authentication unit 105 of the management apparatus 100, an authentication request together with the e-mail address and the password entered by the user via the poster authentication screen illustrated in FIG. 13. Further, the registration authentication requesting unit 207 receives a response indicating whether the authentication is successful or failed.

The imaging unit 208 is implemented mainly by processing of the CPU 21 and the image sensor 26 illustrated in FIG. 4 to convert an image, obtained by imaging, to image data in a predetermined format, and pass the image data to the image transmission unit 209 and the image management unit 211.

The image transmission unit 209 is implemented mainly by processing of the CPU 21 and the wireless communication unit 25 illustrated in FIG. 4 to transmit the image data acquired by the imaging unit 208 to the management apparatus 100. Here, the image transmission unit 209 transmits the image data automatically to the management apparatus 100 regardless of the instruction from the poster.

The rating reception unit 210 is implemented mainly by processing of the CPU 21 and the wireless communication unit 25 illustrated in FIG. 4 to receive, from the rating transmission unit 109 of the management apparatus 100, a notification that certain image data are rated, together with the current number of ratings of the image data.

The image management unit 211 is implemented mainly by the CPU 21 and the flash memory 24 illustrated in FIG. 4 to manage the image data acquired by the imaging unit 208. The image management unit 211 instructs the image display unit 212 to output a list of acquired image data in response to a request from the poster. The image management unit 211 also instructs the image display unit 212 to display the number of ratings of each image data together with each image.

The image display unit 212 is implemented mainly by processing of the CPU 21 and the touch panel 27 illustrated in FIG. 4 to display, on the display, the list of acquired image data and the content of each image data in response to the instruction from the image management unit 211.

Figure 15C:
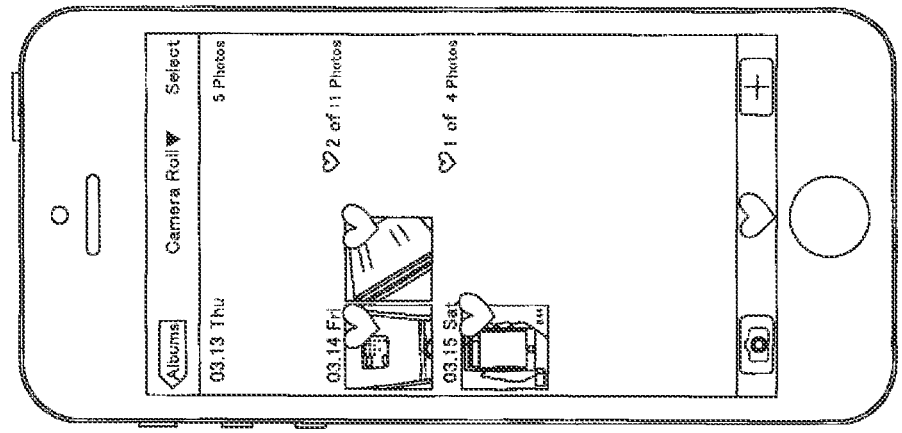
FIG. 15(a)-FIG. 15(c) are diagrams representing example posting image display screens.
Figure 15B:
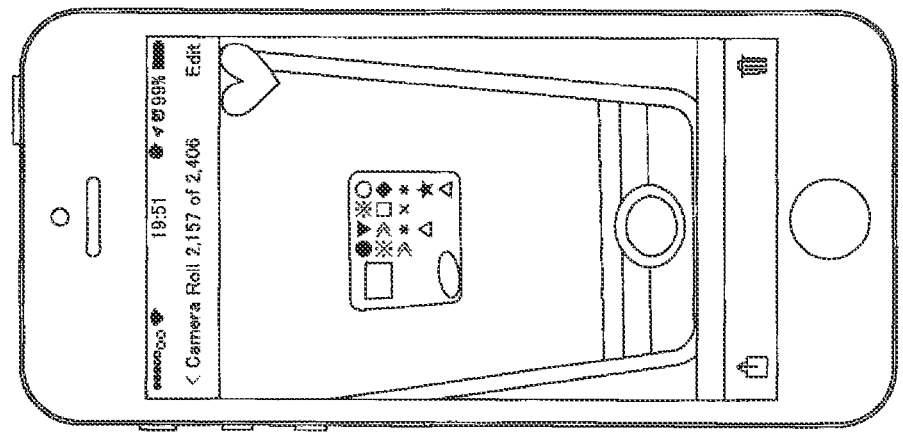
Figure 15A:
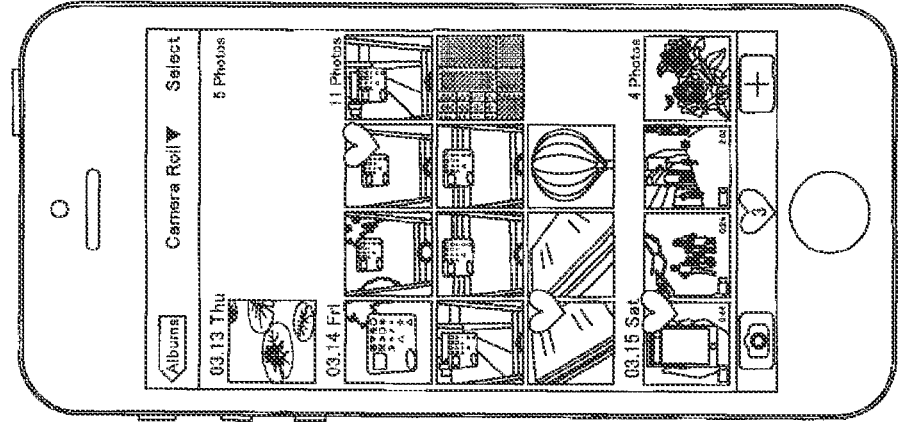

FIGS. 15(a)-15(c) are diagrams representing example posting image display screens. In FIG. 15(a), thumbnail images of image data managed by the image management unit 211 are arranged in order of shooting date. The image display unit 212 can use the number of ratings of each image data notified from the image management unit 211 to display the number of ratings of each image data in the upper right of each thumbnail image. In the example of FIG. 15(a), a heart icon is displayed for image data having one or more ratings.

FIG. 15(b) represents an example of a screen on which one image data selected from the screen of FIG. 15(a) is displayed. FIG. 15(c) represents an example of a screen on which only thumbnails of image data having one or more ratings are displayed.

<3.3 Image Output Device>

The image output device 300 in one embodiment of the present invention has a storage unit 301, an image reception unit 302, an output image management unit 303, an image output unit 304, a control signal acquiring unit 305, a control signal interpreting unit 306, and a license control unit 307.

The storage unit 301 is realized by the flash memory 34 in FIG. 5 to store information such as a device ID 350 specific to the image output device 300, image data 360 delivered from the management apparatus 100, and control signal information 370. Though not illustrated, the storage unit 301 may hold image management information 380 similar to that of the image management information 160 illustrated in FIG. 8 to manage the delivered image data 360. The image management information 160 and the image management information 380 may be synchronized with each other as needed.

The control signal information 370 is information for associating control code, indicative of a control signal acquired from the display device 400 through the HDMI 36, and an operation content corresponding to the control code according to an operation on the remote control device 500. The format of the control signal is defined, for example, in the HDMI-CEC (Consumer Electronics Control) standards.

FIGS. 9(a)-9(b) are diagrams representing two kinds of example tables to store the control signal information 370. The tables illustrated in FIGS. 9(a)-9(b) are prepared for each manufacturer of the display device 400. This is because the control code may be different from manufacturer to manufacturer even if the operation is the same. In FIG. 9(a), four control codes 2001 to 2004 are assigned to operation buttons A to D of the remote control device 500. On the other hand, FIG. 9(b) represents an example of assignment different from that illustrated in FIG. 9(a). Note that each manufacturer is identified by detecting identification code acquirable from a control signal to identify the manufacturer, or detecting the control signal specific to the manufacturer.

Note that the operation buttons A to D may be any buttons on a remote controller of typical digital TV, such as numeric buttons, up, down, right, and left buttons, blur, red, green, and yellow buttons, a menu button, an OK button, a play button, and the like.

The image reception unit 302 is implemented mainly by processing of the CPU 31 and the wireless communication unit 35 in FIG. 5 to receive image data delivered from the image delivery unit 108 of the management apparatus 100 through the wireless network 3. When the image output device 300 is activated, the image reception unit 302 connects to the preset wireless network 3 without any operation input from the viewer to receive image data from the management apparatus 100.

The output image management unit 303 is implemented by processing of the CPU 31 in FIG. 5 to instruct the image output unit 304 to output image data stored in the storage unit 301 to the display device 400. The output image management unit 303 also instructs the image output unit 304 to accept an operation of the user (viewer) of the remote control device 500 through the control signal interpreting unit 306 and output a display screen corresponding to the operation. For example, the output image management unit 303 can display a screen representing a list of image data, a screen of selected image data alone, a license renewal screen, a setting screen for the image output device 300, and the like.

When the image output device 300 is activated by the viewer for the first time, the output image management unit 303 reads one of image data stored in the storage unit 301, and instructs the image output unit 304 to output the image.

FIGS. 14(a)-14(e) represent example screens output by the image output unit 304 in response to an instruction from the output image management unit 303. FIG. 14(a) represents an example in which the output image management unit 303 outputs image data when the image output device 300 is activated for the first time. Thus, when operating the remote control device 500 to make the video input settings of the display device 400 in the HDMI input to which the image output device 300 is connected, the viewer can view image data posted by the poster without the need to carry out any other operation. Therefore, the viewer has such an impression that image data can be checked easily, and this motivates the viewer to view subsequent image data.

FIG. 14(b) represents an example in which the output image management unit 303 sorts out, by shooting date, and displays the image data 360 stored in the storage unit 301. For example, the viewer can operate the "menu" button on the remote control device 500 to display the screen illustrated in FIG. 14(b). On this screen, the viewer can select a desired period (here, every half a month) to further view images during the period.

In FIG. 14(b), a thumbnail image of a representative image among images shot during each period is displayed, and the number of images shot during the period and the sum of the numbers of ratings of images shot during the period are displayed on the left side of the thumbnail image. FIG. 14(b) also includes a link to "latest photo" as a mode of displaying image data in descending order from the newest one and a link to "favorites" as a mode of displaying only images registered in the favorites beforehand.

FIG. 14(c) represents an example of a screen when the output image management unit 303 outputs image data rated by the viewer. The viewer can press a predetermined button (e.g., "red" button) on the remote control device 500 while viewing each individual image to rate the image. This function is typically called the "Like" function. In the example of FIG. 14(c), a heart mark is displayed in the upper left of the image thus rated. This can let the viewer know that the image being viewed is already rated.

FIG. 14(d) is a screen similar to that in FIG. 14(c) except that a message for making the coming of the expiration date known is displayed above the image. This screen will be described later.

The output image management unit 303 instructs the image output unit 304 to output the image, together with the message indicating that the expiration date is coming up, in response to an instruction from the license control unit 307. Further, in response to the instruction from the license control unit 307, the output image management unit 303 instructs the image output unit 304 to output a message stating that image output cannot be performed because the expiration date has passed.

The image output unit 304 is implemented by processing of the CPU 31 and the HDMI 36 in FIG. 5 to output, to the display device 400, an image, a menu screen, or a screen including a message in response to an instruction from the output image management unit 303.

The control signal acquiring unit 305 is implemented by the HDMI 36 in FIG. 5 to acquire a control signal input from the display device 400 according to a viewer's operation on the remote control device 500.

The control signal interpreting unit 306 is implemented by processing of the CPU 31 in FIG. 5 to analyze the control signal acquired by the control signal acquiring unit 305 and identify the content of the viewer's operation. The control signal interpreting unit 306 can detect information specific to a manufacturer included in the control signal to identify the manufacturer. For example, the control signal interpreting unit 306 uses control signal information 370 illustrated in FIGS. 9(a)-9(b), which is prepared for each manufacturer, to identify the operation content (an operation button, such as blue, red, green, yellow, OK, arrow, return, menu, or the like) input by the viewer. Then, the control signal interpreting unit 306 passes along the operation content to the output image management unit 303.

Further, when detecting an operation content indicating that the rating is given to each individual image, the control signal interpreting unit 306 notifies the management apparatus 100 to that effect.

The license control unit 307 is implemented by processing of the CPU 31 illustrated in FIG. 5 to limit the functions of the image output device 300 in response to an instruction from the license management unit 110 of the management apparatus 100. For example, when being instructed from the license management unit 110 of the management apparatus 100 to output a warning message stating that the expiration date comes up in a certain period of time, the license control unit 307 instructs the output image management unit 303 to output an image together with the warning message. Further, when receiving, from the license management unit 110 of the management apparatus 100, a notification that the expiration date has passed, the license control unit 307 instructs the output image management unit 303 to output a message stating that image output cannot be performed because the expiration date has passed.

Like FIG. 14(c), FIG. 14(d) is a screen to output an individual image, but the screen includes a warning message together with the image. Further, FIG. 14(e) includes a message stating that image output cannot be performed because the expiration date has passed.

<Display Device and Remote Control Device>

The display device 400 has a display unit 401, a radio signal receiving unit 402, and a control signal notifying unit 403.

The display unit 401 displays, on the screen, a screen output from the image output unit 304 of the image output device 300.

The radio signal receiving unit 402 receives a radio signal (e.g., an infrared signal) from the remote control device 500.

The control signal notifying unit 403 notifies the image output device 300 of a control signal corresponding to the radio signal received by the radio signal receiving unit 402.

The remote control device 500 has an operation unit 501 and a radio signal transmitting unit 502.

The operation unit 501 accepts operation input from the viewer.

The radio signal transmitting unit 502 transmits, to the display device 400, a radio signal corresponding to the operation input accepted by the operation unit 501.

4. Operation Examples

Referring next to FIG. 16 to FIG. 19, examples of operation of the system 1 in one embodiment of the present invention will be specifically described. In the examples to be described below, a scenario is assumed in which a user (poster) "Jiro Yamada" uses the system 1 in the embodiment with the thought of sharing photos of his just-born eldest son primarily with his father "Ichiro Yamada" (viewer) living in a remote place.

<4.1 Viewer Information Registration Process>

FIG. 16 is a sequence diagram representing a viewer information registration process. "Jiro Yamada" as the poster uses the function of a browser on the communication terminal 200 used by himself to view a website provided by the registration acceptance unit 102 of the management apparatus 100. As already described, FIGS. 10(a)-10(b) represent the screens of such a website. The poster enters viewer information (name, postal code, address, telephone number) on "Ichiro Yamada" as the viewer, and his e-mail address as the poster via the screens, and holds the register button down.

In response to holding the register button down, the registration request unit 202 of the communication terminal 200 transmits, to the registration acceptance unit 102 of the management apparatus 100, a registration request together with the viewer information and poster's e-mail address (step S101). Then, the registration acceptance unit 102 instructs the device ID generating unit 103 to create a device ID (step S102). In response to the instruction, the device ID generating unit 103 generates a device ID "010001" (step S103), and notifies the registration acceptance unit 102 of the generated device ID (step S104).

The registration acceptance unit 102 creates a new entry in the table that stores the user information 150, and stores the viewer information and poster's e-mail address received in step S101, and the device ID received in step S104 (step S105).

Next, the registration acceptance unit 102 notifies the device ID transmitting unit 104 of the generated device ID and the poster's e-mail address (step S106). Then, the device ID transmitting unit 104 notifies the device ID received from the registration acceptance unit 102 to the poster's e-mail address received from the registration acceptance unit 102 as well (step S107). The device ID transmitting unit 104 notifies the device ID of the image output device 300 used by "Ichiro Yamada" as the viewer to "Jiro Yamada" as the poster by e-mail, for example, as illustrated in FIG. 11.

"Jiro Yamada" as the poster recognizes that the communication terminal 200 receives new e-mail, and carries out an operation to display the e-mail. In response, the device ID display unit 204 of the communication terminal 200 accepts the e-mail received by the device ID receiving unit 203 (step S108), and displays the content (step S109). The viewer can use information indicative of the e-mail text to download and install the image sharing application 250 that runs on the communication terminal 200.

On the other hand, the registration acceptance unit 102 of the management apparatus 100 notifies the device ID to the device ID setting unit 111 in parallel with step S106 mentioned above or after step S106 (step S110). Then, the device ID setting unit 111 sets the device ID "010001" generated in step S103 on the image output device 300 to be shipped to "Ichiro Yamada" as the viewer (step S111).

After that, the administrator of the management apparatus 100 ships the image output device 300 with the set device ID to "Ichiro Yamada" as the viewer. The administrator can ship the image output device 300 using the viewer information of the user information 150 stored in the storage unit 101.

<4.2 Image Delivery Process>

Figure 17:
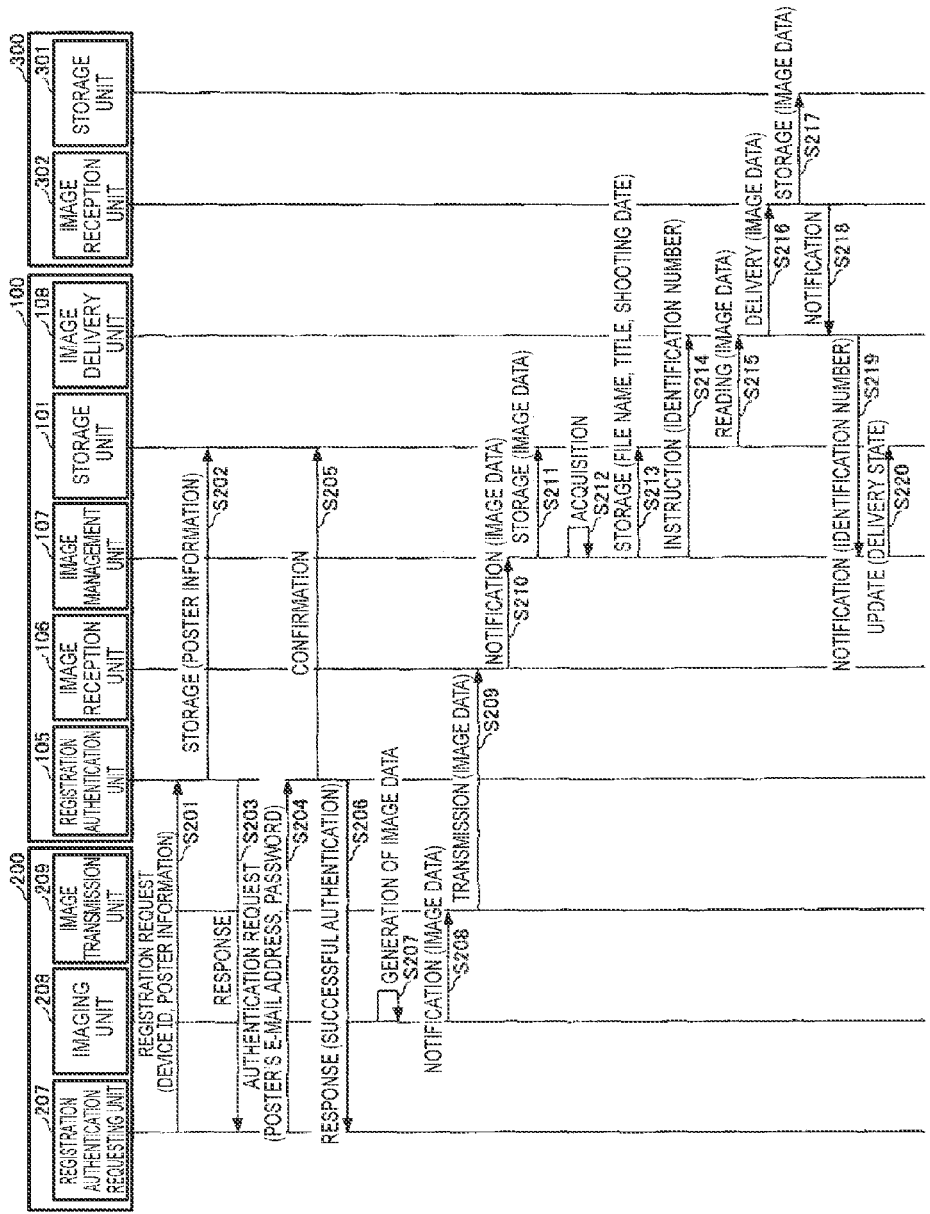
FIG. 17 is a sequence diagram representing an image delivery process.

FIG. 17 is a sequence diagram representing an image delivery process. "Jiro Yamada" as the poster activates the installed application 250 to conduct operations. When the poster activates the application 250 for the first time, the screens illustrated in FIGS. 12(a) to (c) are displayed. On these screens, the poster enters the device ID acquired by e-mail, the poster information (name, e-mail address, password), and the like, and finally holds down the "register" button illustrated in FIG. 12(c).

In response to holding the register button down, the registration authentication requesting unit 207 of the communication terminal 200 transmits, to the registration authentication unit 105 of the management apparatus 100, a registration request together with the device ID, the poster information, and the like (step S201). Then, among the entries of the user information 150 (FIG. 7), the registration authentication unit 105 stores the poster information in an entry having the same device ID as the received device ID (step S202). Here, in the table illustrated in FIG. 7, the poster information acquired in step S201 is stored in an entry the identification number of which is "1." Then, the registration authentication unit 105 notifies the registration authentication requesting unit 207 of the communication terminal 200 of a response indicating that the registration request is processed.

When the poster runs the application 250 for the second time or later, the screen illustrated in FIG. 13 is displayed. The poster enters the poster's e-mail address and password corresponding to the poster information registered in steps S201 to S203 mentioned above, and holds down a button "login with e-mail address."

In response to holding down the above button, the registration authentication requesting unit 207 of the communication terminal 200 transmits, to the registration authentication unit 105 of the management apparatus 100, an authentication request together with the poster's e-mail address and password (step S204). The registration authentication unit 105 checks whether the received combination of poster's e-mail address and password is registered in the user information 150 as the poster's e-mail address and the poster's password (step S205). Then, when the combination of the e-mail address and the password is registered, the registration authentication unit 105 notifies the application 250 of successful authentication (step S206).

After that, the poster shoots a desired scene, a person(s), and the like using the function of the application 250. In response, the imaging unit 208 of the communication terminal 200 generates image data on the shot scene (step S207), and passes the image data to the image transmission unit 209 (step S208). The image transmission unit 209 transmits the received image data to the image reception unit 106 of the management apparatus 100 through the network 2 (step S209).

The image reception unit 106 notifies the received image data to the image management unit 107 (step S210). The image management unit 107 stores the image data as the image data 170 of the storage unit 101 (step S211), and acquires information such as the title and the shooting date from the image data (step S212). Then, the image management unit 107 creates a new entry in the table of the image management information 160, and stores the file name, title, shooting date, and the like of the image data (step S213).

Next, the image management unit 107 instructs the image delivery unit 108 to deliver the image data newly received in step S210 to the image output device 300 (step S214). At this time, the image management unit 107 notifies the image delivery unit 108 of the identification number assigned to the image data in the image management information 160. The image delivery unit 108 identifies the file name of the image data using the received identification number to read the image data (step S215). Then, the image delivery unit 108 delivers the read image data to the image reception unit 302 of the image output device 300 (step S216). Here, the image delivery unit 108 can deliver the image data to the image output device 300 having the device ID associated with the user (poster) whose authentication is completed in steps S204 to S206.

The image reception unit 302 of the image output device 300 stores the received image data as the image data 360 of the storage unit 301 (step S217). Then, the image reception unit 302 notifies the image delivery unit 108 of the management apparatus 100 that the image data are received correctly (step S218). The image delivery unit 108 notifies the image management unit 107, together with the identification number of the image data, that the transmitted image data are delivered normally (step S219). In response to the notification received from the image delivery unit 108, the image management unit 107 sets, to "done," the delivery state of the image data corresponding to the identification number in the image management information 160 illustrated in FIG. 8 (step S220).

Note that the authentication processing of steps S204 to S206 may not be performed immediately after the application 250 is activated for the first time and the registration request is processed in steps S201 to S203.

<4.3 Image Output Process and Rating Process>

Figure 18:
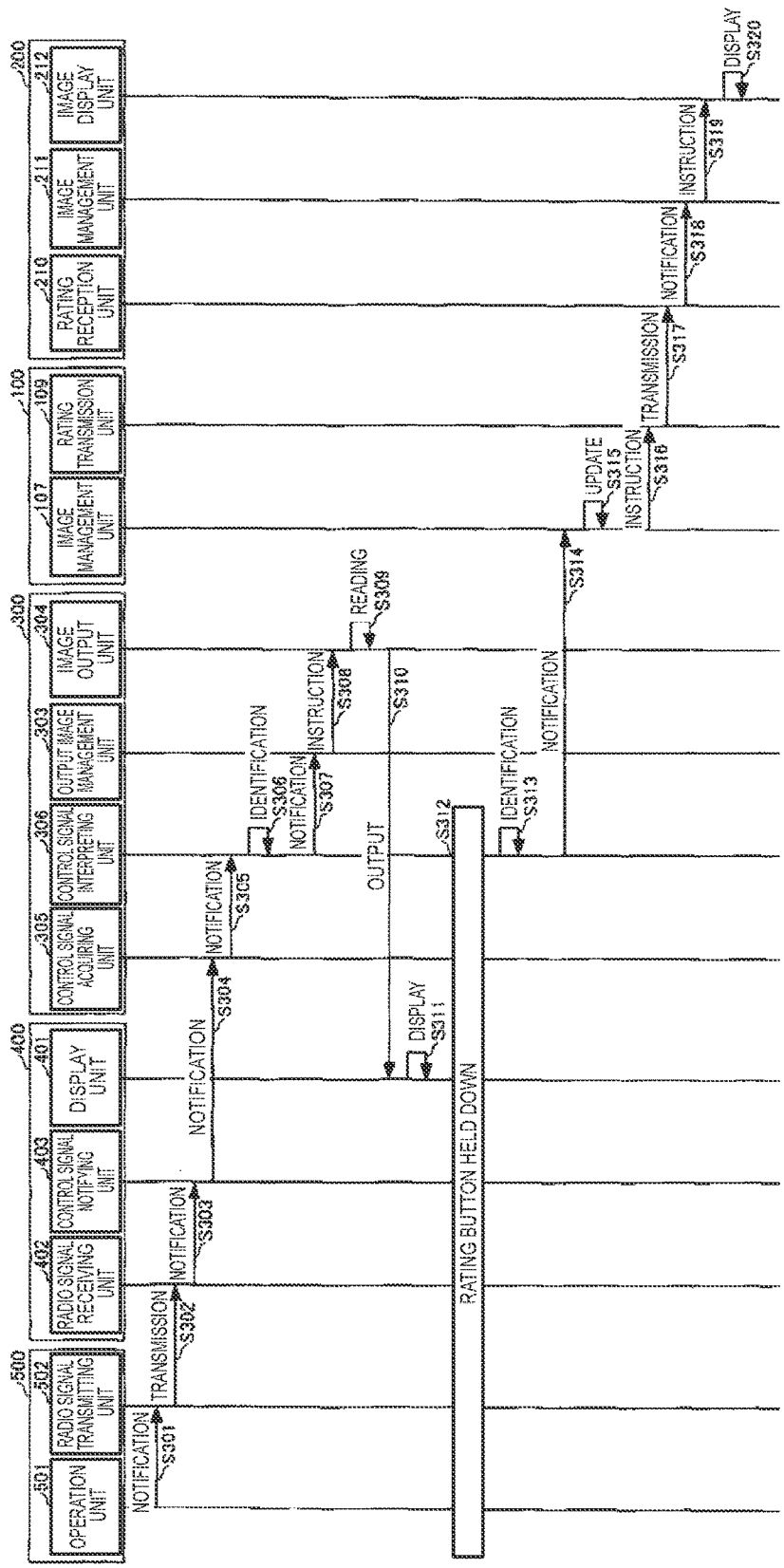
FIG. 18 is a sequence diagram representing an image output process and a rating process.

FIG. 18 is a sequence diagram representing an image output process and a rating process. Here, the description is made on the assumption that the user (viewer) of the image output device 300 operates the remote control device 500, for example, on the screen illustrated in FIG. 14(b) to select the item of period "1/1>1/15" and hold down the operation button "A." The operation button "A" may be, for example, the "OK" button on a remote controller of typical digital TV.

The operation unit 501 of the remote control device 500 accepts input of the operation button by the viewer, and notifies the radio signal transmitting unit 502 of code assigned to the operation button "A" (step S301). The radio signal transmitting unit 502 transmits the received code to the radio signal receiving unit 402 of the display device 400 through infrared communication (step S302). Then, the control signal notifying unit 403 acquires the code received by the radio signal receiving unit 402 (step S303).

The control signal notifying unit 403 converts the acquired code to control code (e.g., "2001") used in the HDMI-CEC standards, and notifies the control code to the control signal acquiring unit 305 of the image output device 300 (step S304). The control signal acquiring unit 305 notifies the acquired control code to the control signal interpreting unit 306 (step S305).

The control signal interpreting unit 306 identifies the manufacturer of the display device 400 based on the control code transmitted from the display device 400, any control signal other than the control code, or the like to identify an operation content (holding down the operation button "A," which corresponds to "OK") corresponding to the control code "2001" acquired in step S305 (step S306). At this time, the control signal interpreting unit 306 can use the control signal information 370 illustrated in FIGS. 9(a)-9(b).

The control signal interpreting unit 306 notifies the identified operation content to the output image management unit 303 (step S307). The output image management unit 303 instructs the image output unit 304 to output image data the shooting dates of which are in the period "1/1>1/15" in response to input of "OK" on the screen illustrated in FIG. 14(b) (step S308). The image output unit 304 reads corresponding image data from the storage unit 301 (step S309), and outputs the image data to the display unit 401 of the display device 400 (step S310). Then, the display unit 401 of the display device 400 displays the image data (step S311).

Here, it is assumed that a "B" button of the remote control device 500 is held down (corresponding to an operation for rating an image being displayed) after the viewer views image data titled "Athletic Festival" and the identification number of which is "1002." In this case, the control signal interpreting unit 306 of the image output device 300 acquires the control code "2002" by processing similar to steps S301 to S305 mentioned above (step S312).

The control signal interpreting unit 306 identifies the operation content (holding the operation button "B" down) corresponding to the control code "2002" acquired in step S312 (step S313). Since the operation content is that "rating" is done, the control signal interpreting unit 306 notifies the image management unit 107 of the management apparatus 100 to that effect (step S314). At this time, the control signal interpreting unit 306 notifies the identification number "1002" of the rated image data to the image management unit 107 of the management apparatus 100. The image management unit 107 refers to the image management information 160 (FIG. 8) in the storage unit 101 to increment the rating number corresponding to the received identification number "1002" by one (step S315).

Further, the image management unit 107 of the management apparatus 100 instructs the rating transmission unit 109 to transmit the current number of ratings of the image to the communication terminal 200 in order to indicate that the image with the identification number "1002" is rated (step S316). In response to the instruction from the image management unit 107, the rating transmission unit 109 transmits, to the rating reception unit 210 of the communication terminal 200, a notification that the image with the identification number "1002" is rated, and the number of ratings for the image (step S317).

The rating reception unit 210 notifies the received information to the image management unit 211 (step S318). The image management unit 211 instructs the image display unit 212 to display the notification that the image with the identification number "1002" is rated (step S319). The image management unit 211 may also store, in the storage unit (not illustrated), the number of ratings for the received identification number "1002." The image display unit 212 displays the notification that the image with the identification number "1002" is rated (for example, using the heart mark illustrated in FIGS. 15(a)-15(c)) together with the display of the image (step S320).

<4.4 Deadline Management Process>

Figure 19:
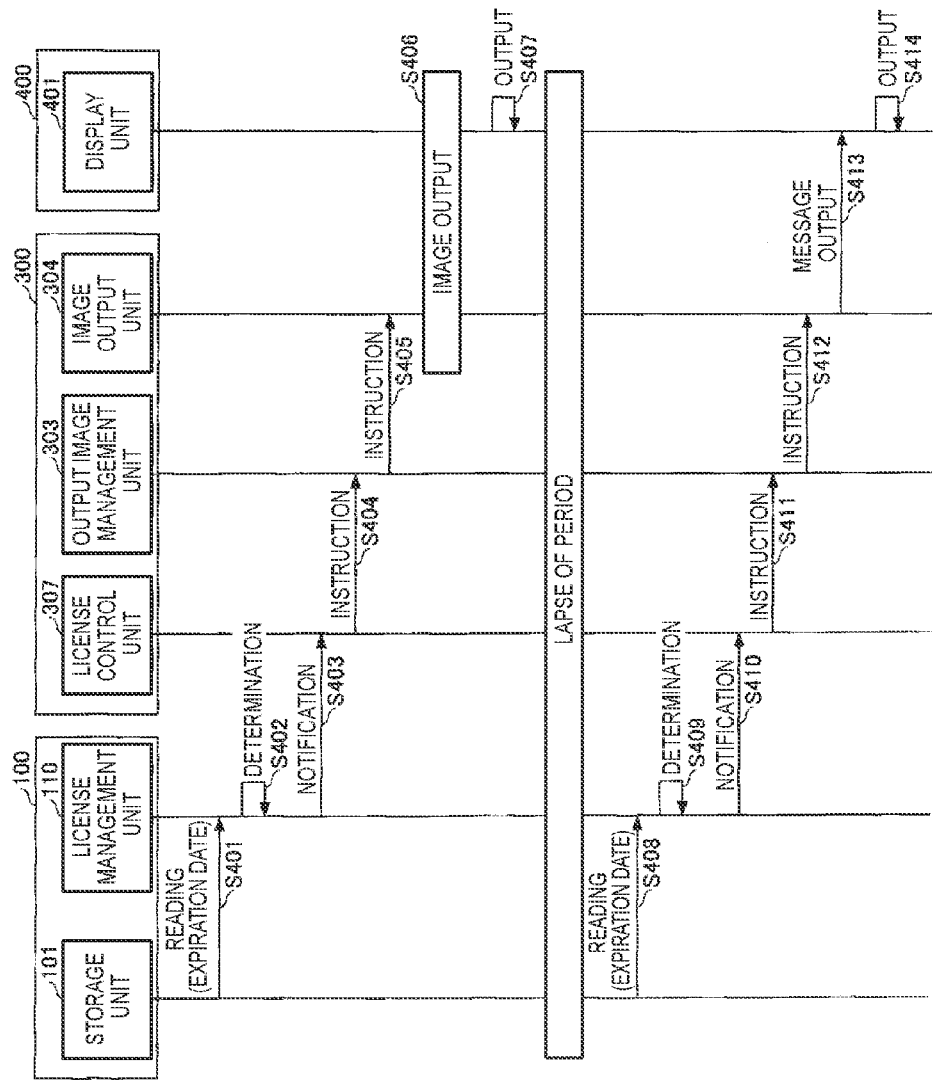
FIG. 19 is a sequence diagram representing a deadline management process.

FIG. 19 is a sequence diagram representing a deadline management process. In the following example, the description is made on the assumption that the current date is "2014/4/20" and the expiration date of the image output device 300 with the device ID "010001" comes in 10 days.

The license management unit 110 of the management apparatus 100 reads the expiration date of each image output device 300 included in the user information 150 of the storage unit 101 (step S401). Here, it is assumed that the license management unit 110 reads the expiration date "2014/4/30" of the image output device 300 with the device ID "010001." The license management unit 110 determines whether a difference between the current date and the read expiration date is predetermined days or less (step S402). Here, it is assumed that the predetermined days are 10 days. In other words, the license management unit 110 determines that the difference between the current date and the read expiration date is 10 days or less. Therefore, the license management unit 110 notifies the license control unit 307 of the image output device 300 with the device ID "010001" to output a warning message stating that the expiration date comes up in a certain period of time (step S403).

The license control unit 307 of the image output device 300 that received the notification instructs the output image management unit 303 to output the warning message stating that the expiration date comes up in a certain period of time (step S404). When the image output process described in steps S301 to S310 of FIG. 18 is executed, the output image management unit 303 instructs the image output unit 304 to output the warning message together with the image (step S405). Then, when the image output process described in steps S301 to S310 of FIG. 18 is executed (step S406), the display unit 401 of the display device 400 displays the warning message stating that the expiration date comes up in the certain period of time (step S407). FIG. 14(d) represents the example of displaying the warning message together with output of the image.

After that, it is assumed that the current date is "2014/5/1" after the lapse of a certain period of time.

The license management unit 110 of the management apparatus 100 reads the expiration date "2014/4/30" of the image output device 300 with the device ID "010001" again. The license management unit 110 determines whether the current date passed the read expiration date (step S409). Here, the license management unit 110 determines that the current date "2014/5/1" passed the expiration date "2014/4/30." Therefore, the license management unit 110 notifies the license control unit 307 of the image output device 300 having the device ID "010001" that the expiration date has passed (step S410).

The license control unit 307 of the image output device 300 that received the notification instructs the output image management unit 303 to output a message stating that image output cannot be performed because the expiration date has passed (step S411). The output image management unit 303 instructs the image output unit 304 to output a message stating that image output cannot be performed with any operation from the user (step S412). The image output unit 304 outputs the message to the display unit 401 of the display device 400 (step S413). The display unit 401 of the display device 400 displays, for example, on the screen as illustrated in FIG. 14(e), the message stating that image output cannot be performed (step S414).

5. Advantageous Effects

As described above, the system 1 in the embodiment enables easy image sharing between two people living remotely from each other without special knowledge. This advantageous effect is realized mainly by the image output device 300 capable of receiving an image automatically by connecting only the power cable and the HDMI cable. Since this image output device 300 is associated with a poster who posts the image by the poster doing work in advance, the viewer's side is not required to make special settings. Further, the image output device 300 uses existing digital TV and remote controller to enable image viewing, and this allows even a user who does not know much about information equipment to carry out operations easily. Further, the poster of an image can transmit the image shot using the application 250, installed on the communication terminal 200, automatically to the image output device 300 through the management apparatus 100.

Further, the system 1 in the embodiment can notify feedback about an image from the viewer of the image as needed to the poster of the image. Further, the system 1 in the embodiment can manage the expiration date of the image output device 300 to urge the viewer to extend the expiration date in order to continue using the image sharing service.

In the above-mentioned embodiment, the image output device 300 and the display device 400 have different housings. However, for example, the image output device 300 and the display device 400 may be integrated and provided as one image output device 300A. In this case, the image output device 300A has the hardware provided in the image output device 300 illustrated in FIG. 5 in addition to the hardware provided commonly in the display device 400. The image output device 300A also has the functions of the image output device 300 and the functions of the display device 400 illustrated in FIG. 6. Thus, the image output device 300A integrated with the display device 400 is provided to allow the viewer to check images delivered from the poster without any regard to the existence of the image output device 300 having an individual housing.

Further, in the above-mentioned embodiment, the display device 400 and the remote control device 500 communicate with each other through radio signals. However, the display device 400 and the remote control device 500 may be connected by a cable to perform cable communication. In this case, the radio signal receiving unit 402 of the display device 400 functions as a cable signal receiving unit and the radio signal transmitting unit 502 of the remote control device 500 functions as a cable signal transmitting unit in FIG. 6.

Further, in the above-mentioned embodiment, the description is made using an example in which the display device 400 is digital TV. In the above example, the viewer can control the operation of the image output device 300 mainly by operating the remote control device 500. However, when the display device 400 is a device such as a laptop PC, a tablet, or a smartphone, the viewer may control the operation of the image output device 300 by operating an input device(s) provided in the main body of the display device 400. Therefore, the display device 400 may have hardware components such as a touch panel and operation buttons to have the function of an operation unit (not illustrated) that accepts operations from the viewer. In this case, the function of the radio signal receiving unit 402 and the function of the remote control device 500 illustrated in FIG. 6 are unnecessary.

6. Application Examples

In the above-mentioned embodiment, an example of the system 1 having one communication terminal 200 and one image output device 300 (and the display device 400 and the remote control device 500) is described. The following will describe an example of a system 1A having plural communication terminals 200 and plural image output devices 300. In other words, plural viewers can view image data posted by plural posters in the system 1A. In the following, points different from the above-mentioned embodiment will be mainly described.

In this embodiment, user information 150A illustrated in FIGS. 20(a)-20(b) is used instead of the user information 150 illustrated in FIG. 7 to associate plural viewers (i.e., image output devices 300) with plural posters.

The user information 150A illustrated in FIGS. 20(a)-20(b) has two tables. FIG. 20(a) illustrates a table for storing viewer information as information on viewers, and FIG. 20(b) illustrates a table for storing poster information as information on posters. Information stored in each table is similar to the user information 150 illustrated in FIG. 7. Here, however, items of "viewer ID" and "poster ID" are newly provided instead of "identification number" to identify each table entry. These IDs are used to identify a viewer and a poster.

Further, the storage unit 101 of the management apparatus 100 in this embodiment can newly store group information 180. The group information 180 is information for associating the above-mentioned plural viewers and plural posters.

FIG. 21 represents an example of a table to store the group information 180. The group information 180 has items of group ID, viewer ID, and poster ID. The group ID is an identifier used to identify a group composed of plural viewers and plural posters. The viewer ID corresponds to a viewer ID included in the user information 150A illustrated in FIG. 20(a). The poster ID corresponds to a poster ID included in the group information 180 illustrated in FIG. 20(b).

The registration acceptance unit 102 of the management apparatus 100 in the embodiment can manage information stored in the group information 180 mentioned above.

Figure 22:
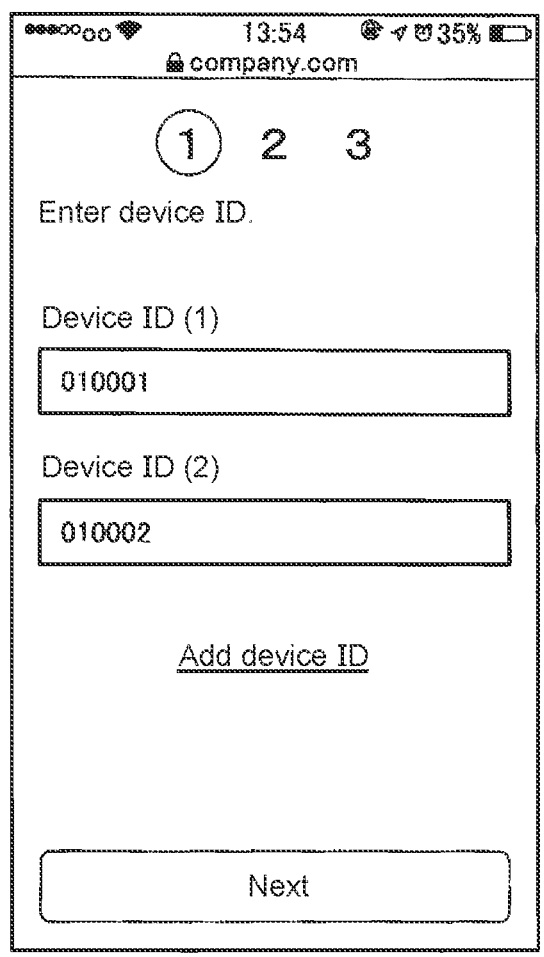
FIG. 22 is a diagram representing an example of a poster information registration screen.

FIG. 22 is an example of a screen displayed on each communication terminal 200 by the registration acceptance unit 102 instead of the screen illustrated in FIG. 12(a). The user of the communication terminal 200 can complete poster registration using not only the device ID obtained in the registration process executed by the user, but also a device ID notified from a viewer already using an image output device 300.

The registration acceptance unit 102 sets, in the item of poster ID in the group information 180, a poster ID of the poster whose registration is accepted. Further, the registration acceptance unit 102 retrieves, from the user information 150A illustrated in FIG. 20(a), viewer IDs corresponding to plural device IDs specified in the registration process, and registers the specified viewer IDs in the item of viewer ID of the group information 180. The registration acceptance unit 102 may output a web page (not illustrated) to change viewers and posters that constitute each group in response to a request from a poster or a viewer.

<Image Delivery Process>

Figure 23:
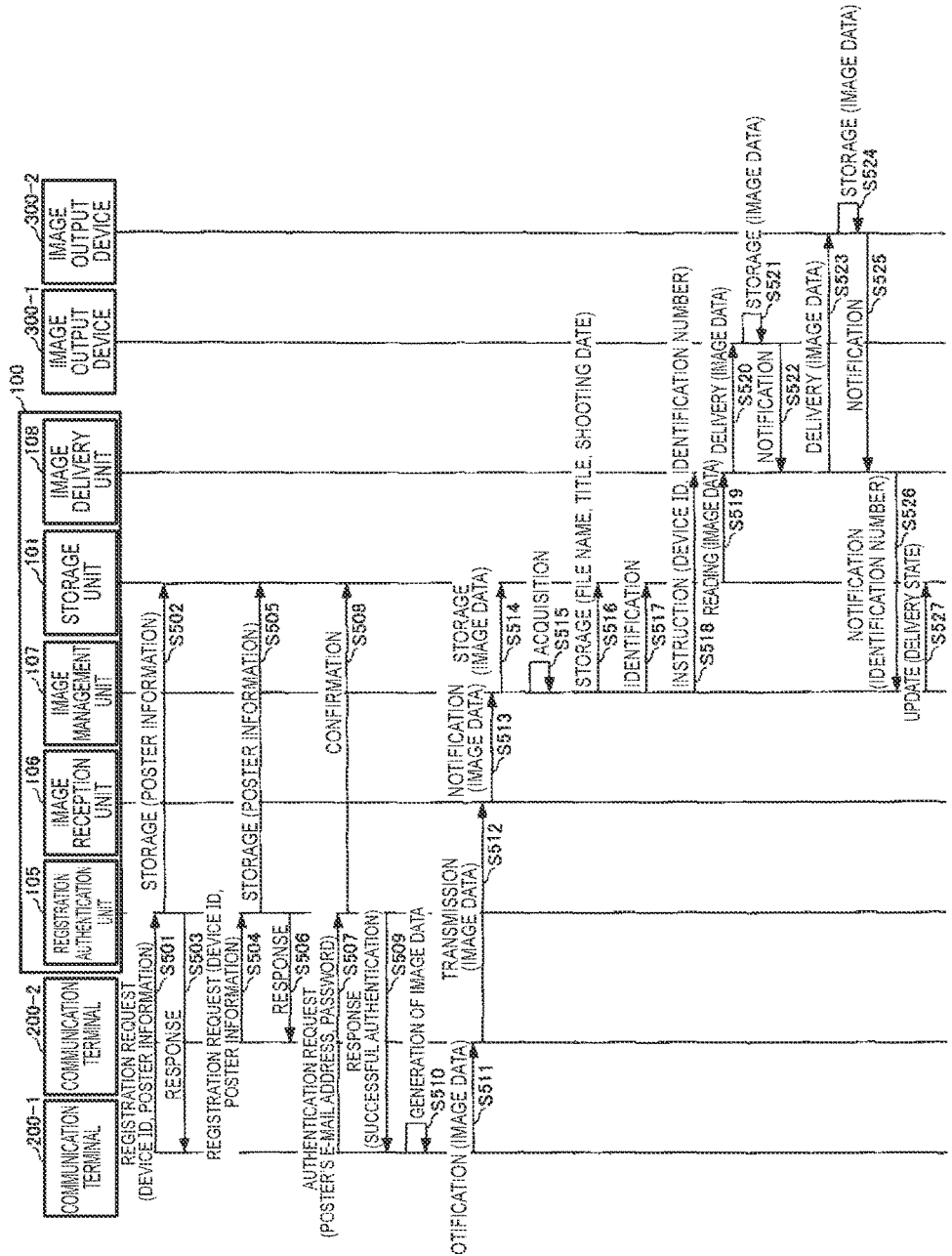
FIG. 23 is a sequence diagram representing an image delivery process.

FIG. 23 is a sequence diagram illustrating an image delivery process in the embodiment. Unlike the sequence diagram illustrated in FIG. 17, the sequence diagram illustrated in FIG. 23 illustrates two communication terminals 200-1, 200-2, and two image output devices 300-1, 300-2. Here, it is assumed that users (posters) of the communication terminals 200-1, 200-2 complete the viewer information registration process illustrated in FIG. 16 and have the device IDs of the image output devices 300-1, 300-2, respectively.

In the following example, "Jiro Yamada" (poster ID "101") as a first poster performs the registration process using the communication terminal 200-1, and then "Jiro Tanaka" (poster ID "102") as a second poster performs the registration process using the communication terminal 200-2. Further, "Jiro Yamada" as the first poster specifies device IDs "010001" and "010002" of the image output devices 300-1 and 300-2, performs the viewer registration process, and after that, transmits image data to these two image output devices.

Like in steps S201 to S203 of FIG. 17, the communication terminal 200-1 first registers the device IDs and poster information with the management apparatus 100 (steps S501 to S503). Here, the registration authentication unit 105 of the management apparatus 100 causes the communication terminal 200-1 to display the screen illustrated in FIG. 22, and receives two device IDs "010001" and "010002." Then, like in steps S501 to S503, the communication terminal 200-2 registers the device IDs and poster information with the management apparatus 100 (steps S504 to S506).

Next, like in steps S204 to S213 of FIG. 17, the communication terminal 200-1 makes an authentication request to the management apparatus 100, and after that, transmits image data (step S507-S516). Then, the image management unit 107 of the management apparatus 100 refers to the group information 180 (FIG. 21) in the storage unit 101 to identify the viewer IDs "301" and "302" belonging to the same group as the poster ID "101" of the poster "Jiro Yamada" who posted the image data, and further refers to the user information 150A (FIG. 20(a)) to identify the device IDs "010001" and "010002" corresponding to the identified viewer IDs (step S517).

Next, the image management unit 107 of the management apparatus 100 instructs the image delivery unit 108 to deliver the image data newly received in step S513 to the image output devices 300-1 and 300-2 having the device IDs "010001" and "010002" identified in step S517 (step S518). At this time, the image management unit 107 notifies the image delivery unit 108 of an identification number assigned to the image data in the image management information 160.

Next, the image delivery unit 108 identifies a file name of the image data using the received identification number to read the image data (step S519). Then, the image delivery unit 108 delivers the read image data to the image output devices 300-1, 300-2, respectively, and receives a notification that the image data are received (steps S520 to S522, and steps S532 to S525). When receiving the notification that the image data are received from all image output devices 300 having the device IDs identified, the image delivery unit 108 transmits the notification to the image management unit 107 (step S526). In response to the notification received from the image delivery unit 108, the image management unit 107 sets "done" as the delivery state of the image data corresponding to the identification number in the image management information 160 illustrated in FIG. 8 (step S527).

After that, when the communication terminal 200-2 transmits the image data to the management apparatus 100, the management apparatus 100 can deliver the image data to both of the image output devices 300-1, 300-2 like in the above-mentioned process.

In the example illustrated in FIG. 23, the description is made by using the two communication terminals 200-1, 200-2, and the two image output devices 300-1, 300-2, but three or more communication terminals 200 or image output devices 300 may be used.

<Image Output Process and Rating Process>

Figure 24:
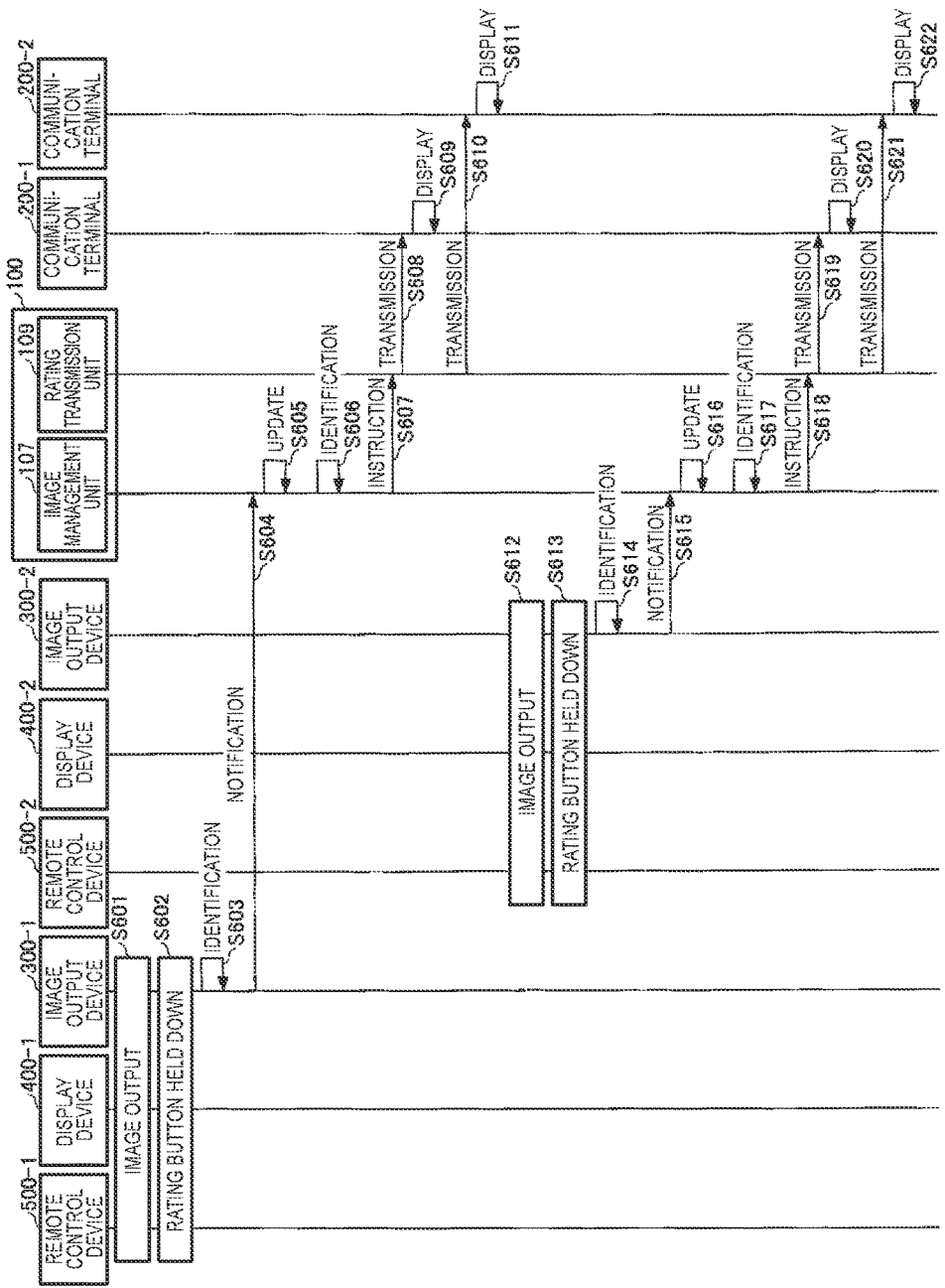
FIG. 24 is a sequence diagram representing an image output process and a rating process.

FIG. 24 is a sequence diagram representing an image output process and a rating process in the embodiment. Unlike the sequence diagram illustrated in FIG. 18, the sequence diagram illustrated in FIG. 24 illustrates two pairs of image output devices 300, display devices 400, and remote control devices 500, and two communication terminals 200-1, 200-2. Here, like in the example of FIG. 23, the description will be made on the assumption that the users (posters) of the communication terminals 200-1, 200-2 and users (viewers) of the image output devices 300-1, 300-2 form one group in the group information 180 (FIG. 21).

First, in steps similar to steps S301 to S311 in FIG. 18, the image output device 300-1 outputs image data to a display device 400-1 identified with the identification number "1002" (step S601). After that, when the viewer of the image output device 300-1 holds down the "B" button (corresponding to the operating for rating an image being displayed) on the remote control device 500-1, the control signal interpreting unit 306 of the image output device 300-1 acquires control code "2002" (step S602). After that, in processing similar to steps S313 to S315 in FIG. 18, the image management unit 107 of the management apparatus 100 updates the rating of the image data (identification number "1002") in the image management information 160 illustrated in FIG. 8 (steps S603 to S605). In exchange of data with the image output device 300-1, the image management unit 107 receives the device ID "010001" of the image output device 300-1 from which the rating notification is transmitted.

Next, from the user information 150A and the group information 180 in the storage unit 101, the image management unit 107 of the management apparatus 100 identifies the viewer of the image output device 300-1 that transmitted rating, and poster IDs "101" and "102" of the posters in the same group (step S606). Then, the image management unit 107 instructs the rating transmission unit 109 to transmit, to the communication terminals 200-1, 200-2 of the posters having the poster IDs "101" and "102," that the image with the identification number "1002" is rated, and the current number of ratings of the image (step S607).

After that, the rating transmission unit 109 transmits, to the communication terminals 200-1, 200-2 of the posters having the poster IDs "101" and "102," that the image with the identification number "1002" is rated, and the current number of ratings of the image (steps S608 to S609, and steps S610 and S611).

Further, like in steps S601 to S605, the image output device 300-2 (device ID "010002") from which the image data are output accepts the rating of image data identified with the identification number "1002" to cause the management apparatus 100 to update the rating of the image data (steps S612 to S616). In response, like in step S606, the image management unit 107 of the management apparatus 100 identifies, from the user information 150A and the group information 180 in the storage unit 101, the poster IDs "101" and "102" of the posters in the same group as the viewer of the image output device 300-2 from which the rating is transmitted (step S617). Then, like in steps S607 to S611, the communication terminals 200-1, 200-2 are notified that image data identified with the identification number "1002" are further rated (steps S618 to S622).

By the operation mentioned above, the system 1A of the embodiment enables image sharing among one or more communication terminals 200 and one or more image output devices 300. In other words, images can be shared easily between one or more posters and one or more viewers.

Next, a system 1B capable of transmitting a notification to a poster in response to a viewing state of image data viewed by a viewer will be described. The management apparatus 100 and the image output device 300 in the system 1B can manage, for each image data, when and how far the viewer viewed the image data. Then, the management apparatus 100 in the system 1B transmits a notification to the communication terminal 200 of the poster in response to a change in viewing state. The following will mainly describe points different from the above-mentioned embodiments. Note that the functions provided by the system 1B can be implemented together with the systems 1 and 1A mentioned above.

FIG. 1 can be applied as the outline of the system 1B. Further, as the hardware configurations of the management apparatus 100, the communication terminal 200, and the image output device 300, those in FIG. 3 to FIG. 5 can be applied.

Figure 25:
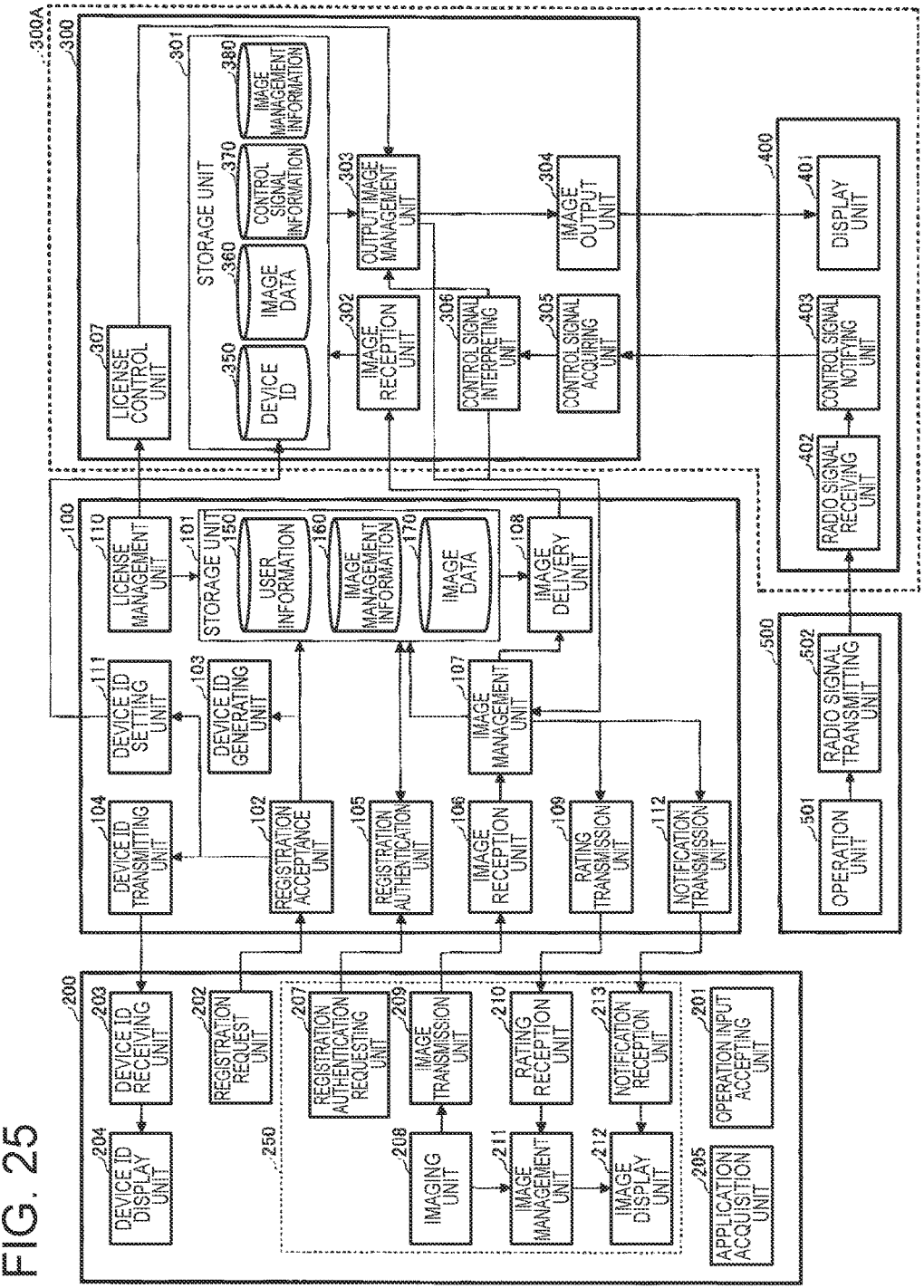
FIG. 25 is a functional block diagram of a system in one embodiment of the present invention.

FIG. 25 is a functional block diagram of the system 1B in one embodiment of the present invention.

The storage unit 101 of the management apparatus 100 in this embodiment stores second image management information 160A illustrated in FIG. 26 in addition to the image management information 160 illustrated in FIG. 8. Information included in the second image management information 160A is associated by the identification number with each image data stored in the image management information 160. The second image management information 160A can store a viewing state of image data by the viewer (e.g., "not viewed," "viewed," or "interrupted"), the viewing date and time represented by the latest date and time among the starting dates and times of viewing, and an interrupted position represented by an elapsed time from the start of viewing when the image data are video and viewing of the video is interrupted, in addition to the identification number and the file name. The second image management information 160A may also include any other information. Further, like the image management information 160, the second image management information 160A may be synchronously stored in the storage unit 301 of the image output device 300 as second image management information 380A.

The output image management unit 303 of the image output device 300 in the embodiment receives a control signal corresponding to an operation to start viewing one image data (e.g., selection operation by holding down the OK button) via the control signal interpreting unit 306 during output of the screen, for example, illustrated in FIG. 14(*b*). In response, the output image management unit 303 outputs the image data to the display device 400, and refers to the second image management information 380A to update the viewing state and viewing date and time of the selected image data.

For example, when the viewing state of the image data is "not viewed," the output image management unit 303 updates the viewing state to "viewed" and stores the current date and time in the item of viewing date and time. When the viewing state of the image data is "viewed," the output image management unit 303 stores the current date and time in the item of viewing date and time.

Further, in the case of video as the image data, when receiving a control signal corresponding to an operation to interrupt viewing (e.g., an interrupt operation by holding down the return button) from the control signal interpreting unit 306 before viewing of the video is completely finished, the output image management unit 303 updates the viewing state in the second image management information 380A to "interrupted," and stores, in the item of "interrupted position," the position at which viewing of the video is interrupted. In the example of FIG. 26, it is found that viewing of video data "newbaby2.mp4" with an identification number "1003" is interrupted at the time "00:01:30" as the interrupted position represented by the elapsed time from the start of viewing. While the video is being viewed, the output image management unit 303 can constantly acquire, from hardware or software for decoding video, information indicating what part of the video is being viewed.

Further, when the second image management information 380A is updated, the output image management unit 303 transmits, to the image management unit 107 of the management apparatus 100, information indicative of the updated content. For example, this information may include the viewer's identification number, the identification number of the updated image data, the updated item (e.g., viewing state), and the content (e.g., "viewed"). The output image management unit 303 may also transmit the updated second image management information 380A to the management apparatus 100.

The management apparatus 100 in the embodiment has a notification transmission unit 112. The notification transmission unit 112 is implemented by processing of the CPU 11 and the NIC 15 in FIG. 3 to transmit a notification to the communication terminal 200 of the poster of the image data in response to an instruction from the image management unit 107.

The image management unit 107 of the management apparatus 100 in the embodiment instructs the notification transmission unit 112 to transmit a notification according to the content of information transmitted from the output image management unit 303 of the image output device 300. For example, when the viewing state of image data as "not viewed" is updated to "viewed," the image management unit 107 instructs the notification transmission unit 112 to transmit the notification to the communication terminal 200 of the poster of the image data. Upon this notification, the image management unit 107 may also instruct the notification transmission unit 112 to transmit, to the communication terminal 200, the viewing date and time, and the interrupted position when viewing is interrupted.

Figure 27:
FIG. 27 is a diagram representing an example of a viewing state notification screen.

The communication terminal 200 in the embodiment has a notification reception unit 213. The notification reception unit 213 is implemented by processing of the CPU 21 and the wireless communication unit 25 in FIG. 4 to receive the notification transmitted from the notification transmission unit 112 of the management apparatus 100. For example, as illustrated in FIG. 27, the notification may be output to the touch panel 27 of the communication terminal 200. In this case, the notification reception unit 213 instructs the image display unit 212 to display the notification transmitted from the notification transmission unit 112 of the management apparatus 100. The image display unit 212 displays the notification transmitted from the management apparatus 100 according to the instruction from the notification reception unit 213.

Figure 28:
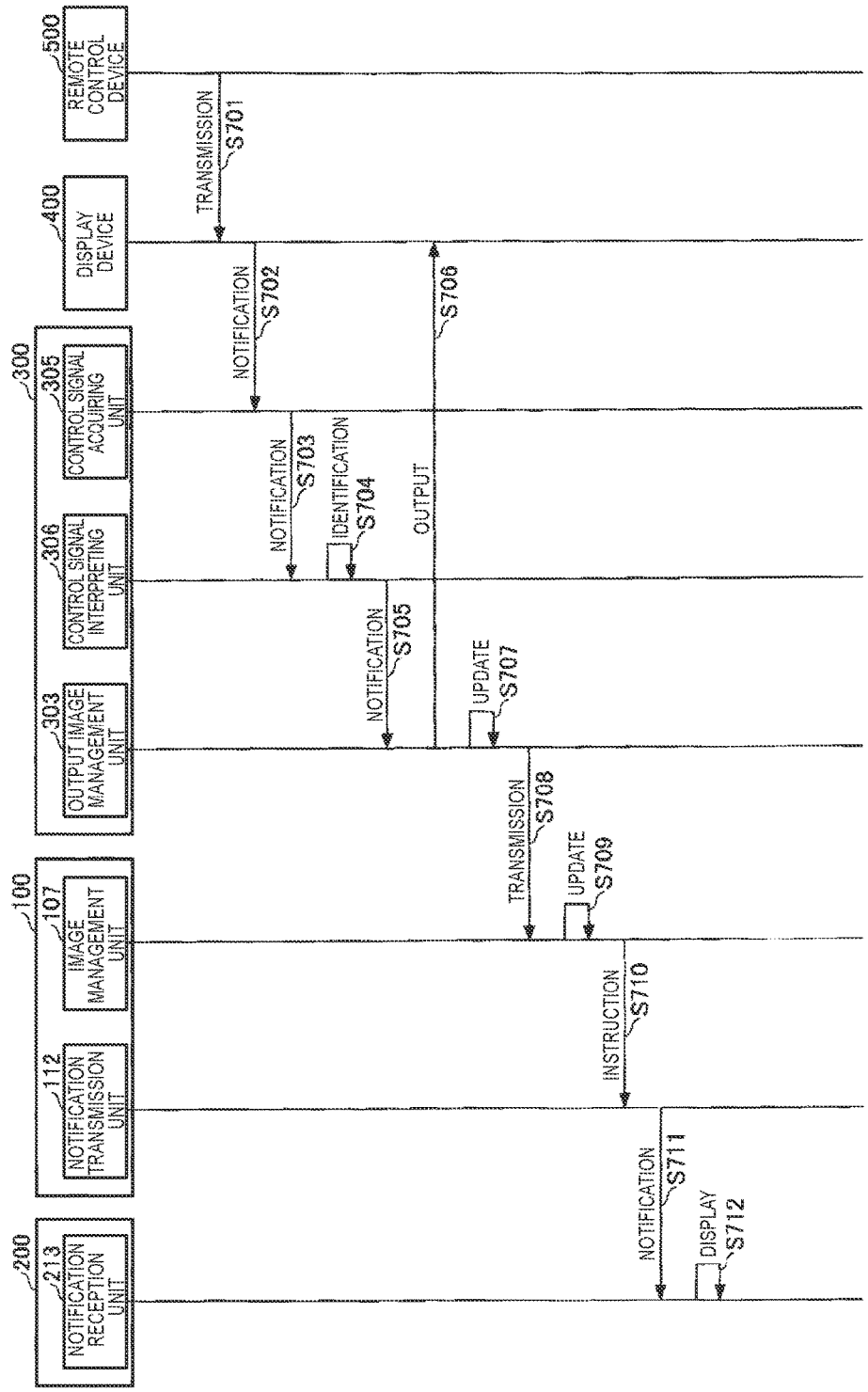
FIG. 28 is a sequence diagram representing a viewing state notification process.

Referring to FIG. 28, a viewing state notification process in the system 1B will be described. Here, it is assumed that the user (viewer "Ichiro Yamada") of the image output device 300 operates the remote control device 500 on the screen, for example, illustrated in FIG. 14(b) to select the item of "1/1>1/15" period and hold down the operation button "A" (OK button). It is also assumed that one image data "newbaby.jpg" (identification number "1001") (see FIG. 8 and FIG. 26) among image data corresponding to the above period is selected through such an operation.

Like steps S301 and S302 in FIG. 18, the remote control device 500 first accepts input of the operation button, and transmits predetermined code to the display device 400 (step S701). Next, like steps S303 and S304 in FIG. 18, the display device 400 notifies the image output device 300 of control code corresponding to the operation button held down (step S702). Then, like steps S305 to S310 in FIG. 18, the image output device 300 identifies the operation content from the control code, and outputs the selected image data to the display device 400 (steps S703 to S706).

Next, the output image management unit 303 of the image output device 300 refers to the second image management information 380A in the storage unit 301 to update the viewing state of the selected image data "newbaby.jpg" to "viewed," and the viewing date and time to "2014/4/15 09:14:15" as the current date and time (step S707). Then, the output image management unit 303 transmits, to the management apparatus 100, information including the viewer's identification number "1" preregistered in the image output device 300, the identification number "1001" of the selected image data, and the updated viewing state "viewed" and viewing date and time "2014/4/15 09:14:15" (step S708).

The image management unit 107 of the management apparatus 100 uses the information received from the image output device 300 to update second image management information 1608 in the storage unit 101 (step S709). Then, the image management unit 107 instructs the notification transmission unit 112 to notify the communication terminal 200 of the poster of the image data, together with the viewing date and time, that the viewing state of the image data having the identification number "1001" is updated (step S710). In response to the instruction from the image management unit 107, the notification transmission unit 112 transmits a notification to the communication terminal 200 (step S711). For example, the notification may include information such as the viewer's name "Ichiro Yamada" (see FIG. 7) who viewed the image data, the title of the image data "Our baby" (see FIG. 8), the viewing date and time "2014/4/15 09:14:15" (see FIG. 26), and the like.

In response to receiving the notification transmitted from the notification transmission unit 112 of the management apparatus 100, the notification reception unit 213 of the communication terminal 200 can display, on a notice screen, for example, as illustrated in FIG. 27, the viewer's name "Ichiro Yamada," the title of the image data "Our baby," and the viewing date and time "2014/4/15 09:14:15" (step S712).

As described above, the system 1B in the embodiment can transmit a notification to the poster according to the viewing state of image data by the viewer. Thus, for example, the poster can know whether the image posted by himself was viewed by the viewer.

In the example of FIG. 28, although the example of giving notice of the viewing state of a still image is described, the same applies to giving notice of the viewing state of video. In the case of video, when an interrupt operation is input in the middle of viewing, "interrupted" is recorded in the item of viewing state of the second image management information 160A, 380A illustrated in FIG. 26, and the interrupted position is recorded in the item of "interrupted position." When viewing of video was interrupted, the image management unit 107 of the management apparatus 100 may send the communication terminal 200 a notification that viewing of video was interrupted, separately from the notification that the video was viewed. In this case, the image management unit 107 may notify the communication terminal 200 of the poster of the interrupted position at which viewing of the video was interrupted.

In the above-mentioned embodiment, the example is illustrated, in which the image output device 300 manages the image management information 160, the second image management information 160A, the image management information 380, and the second image management information 380A of image data based on control codes acquired from the display device 400. However, in the other embodiment of the present invention, the image output device 300 can change the setting content related to image output of the image output device 300 according to control code acquired from the display device 400.

As mentioned above, the image output device 300 can acquire, from the display device 400, a control signal conforming to the HDMI-CEC standards. The image output device 300 can acquire, from the control signal, information on the manufacture name or model number of the display device 400. The image output device 300 may prestore a database to store parameters related to the display characteristics of the display device 400, such as resolution and tone, for each manufacture name or model number. Alternatively, such a database may be acquired from the management apparatus 100 as needed.

When the manufacture name or model number of the display device 400 can be identified from the control signal, the image output device 300 may refer to such a database to change the settings of the image output device 300 using the parameters predefined for each display device 400. This enables the image output device 300 to make the display settings suited for the manufacture name or model number of the display device 400.

While the present invention has been described with reference to the specific embodiments, each of the embodiments is just an illustrative example. It will be understood by those skilled in the art that various variations, alterations, alternatives, replacements, and the like are possible. For the purpose of illustration, each of the devices according to the embodiments of the present invention is described using a functional block diagram, but such a device may be implemented in hardware, software, or a combination of both. The present invention is not limited to the aforementioned embodiments, and various variations, alterations, alternatives, replacements, and the like can be included without departing from the spirit of the present invention.

What is claimed is:

1. An image management system having an image output device communicable with a management apparatus and a display device, wherein
    the management apparatus comprises:
        a first image reception unit that receives image data from a communication terminal; and
        a transmission unit that transmits the received image data to the image output device,
    the image output device comprises:
        a second image reception unit that receive the transmitted image data; and
        an output unit that outputs, to the display device, the image data received by the second image reception unit, and
    the management apparatus further comprises a notification transmission unit that
        (i) obtains, from the image output device, an output state and a viewing date and time, the output state indicating whether the image data has been completely output to the display device by the output unit, the viewing date and time represented by a latest date and time among starting dates and times viewed by a viewer, and
        (ii) transmits a notification including the output state and the viewing date and time to the communication terminal for displaying the output state and the viewing date and time.

2. The image management system according to claim 1, wherein
    the image output device further comprises
        an acquisition unit that acquires a control signal transmitted from the display device in response to input accepted by a remote control device of the display device, and
    the output unit outputs the image data to the display device when the acquisition unit acquires the control signal corresponding to selection of the image data.

3. The image management system according to claim 2, wherein
    the management apparatus further comprises
        a management unit that manages each image data in association with a rating value representing a degree of rating for the image data, and
    the management unit updates the rating value when the acquisition unit acquires the control signal corresponding to the rating of the image data.

4. The image management system according to claim 3, wherein
    the management unit updates the output state of the image data and the viewing date and time when the acquisition unit acquires the control signal corresponding to output start and output end of the image data, and
    the notification transmission unit transmits the notification to the communication terminal according to the updated output state of the image data and the viewing date and time.

5. A management apparatus comprising:
    an image reception unit that receives image data from a communication terminal;
    a transmission unit that transmits the received image data to an image output device to cause the image output device to output the image data to the display device; and
    a notification transmission unit that
        (i) obtains, from the image output device, an output state and a viewing date and time, the output state indicating whether the image data has been completely output to the display device, the viewing date and time represented by a latest date and time among starting dates and times viewed by a viewer, and
        (ii) transmits a notification including the output state and the viewing date and time to the communication terminal for displaying the output state and the viewing date and time.

6. A non-transitory computer readable storage medium storing a program causing a computer to execute:
 a reception step of receiving image data from a communication terminal;
 a transmission step of transmitting the received image data to an image output device to cause the image output device to output the image data to the display device;
 an obtaining step of obtaining, from the image output device, an output state and a viewing date and time, the output state indicating whether the image data has been completely output to the display device, the viewing date and time represented by a latest date and time among starting dates and times viewed by a viewer; and
 a transmitting step of transmitting a notification including the output state and the viewing date and time to the communication terminal for displaying the output state and the viewing date and time.

7. An image output device communicable with a display device and a management apparatus, comprising:
 an image reception unit that receives image data transmitted from a communication terminal;
 an acquisition unit that acquires a control signal transmitted from the display device in response to input accepted by a remote control device of the display device;
 an output unit that outputs, to the display device, the image data when the acquisition unit acquires the control signal corresponding to selection of the image data; and
 a notification transmission unit that
  (i) obtains, from the image output device, an output state and a viewing date and time, the output state indicating whether the image data has been completely output to the display device by the output unit, the viewing date and time represented by a latest date and time among starting dates and times viewed by a viewer, and
  (ii) transmits a notification including the output state and the viewing date and time to the communication terminal for displaying the output state and the viewing date and time.

* * * * *